United States Patent

Donaldson, Jr.

[15] 3,673,576

[45] June 27, 1972

[54] PROGRAMMABLE COMPUTER-PERIPHERAL INTERFACE

[72] Inventor: John C. Donaldson, Jr., Peabody, Mass.

[73] Assignee: E.G. & G., Inc., Bedford, Mass.

[22] Filed: July 13, 1970

[21] Appl. No.: 54,556

Related U.S. Application Data

[63] Continuation-in-part of Ser. No. 886,689, Dec. 16, 1969, abandoned.

[52] U.S. Cl. ........ 340/172.5
[51] Int. Cl. ........ G06f 3/00
[58] Field of Search ........ 340/172.5

[56] References Cited

UNITED STATES PATENTS

| | | | |
|---|---|---|---|
| 3,409,880 | 11/1968 | Galler | 340/172.5 |
| 3,210,733 | 10/1965 | Terzian et al. | 340/172.5 |
| 3,274,561 | 9/1966 | Hallman et al. | 340/172.5 |
| 3,283,308 | 11/1966 | Klein et al. | 340/172.5 |
| 3,406,380 | 10/1968 | Bradley et al. | 340/172.5 |
| 3,411,143 | 11/1968 | Beausoleil et al. | 340/172.5 |
| 3,419,852 | 12/1968 | Marx et al. | 340/172.5 |
| 3,432,813 | 3/1969 | Annunziata et al. | 340/172.5 |
| 3,447,135 | 5/1969 | Calta et al. | 340/172.5 |
| 3,462,741 | 8/1969 | Bush et al. | 340/172.5 |
| 3,475,729 | 10/1969 | Porcelli et al. | 340/172.5 |
| 3,479,649 | 11/1969 | Bahrs et al. | 340/172.5 |
| 3,514,758 | 5/1970 | Bennett | 340/172.5 |
| 3,550,133 | 12/1970 | King et al. | 340/172.5 |
| 3,559,187 | 1/1971 | Figueroa et al. | 340/172.5 |
| 3,573,741 | 4/1971 | Gavril | 340/172.5 |

*Primary Examiner*—Gareth D. Shaw
*Assistant Examiner*—Sydney R. Chirlin
*Attorney*—Ralph C. Cadwallader, Lawrence P. Benjamin and Cesari and McKenna

[57] ABSTRACT

An interfacing network for providing asynchronous data transfers directly with a computer memory and external devices. Computer instructions from the computer arithmetic unit are decoded in an executive control unit. Certain instructions ready an input or output channel control unit which thereafter controls data transfers with a selected external device. Each transfer is made directly with the computer memory and does not require interruption of the program being processed in the arithmetic unit. Once the input or output channel control unit assumes control of the transfer, the executive control unit is immediately available to perform other functions independently and concurrently. It may ready the other channel control unit and monitor external device and interface conditions including the readiness of an external device to transmit data. Certain monitored conditions cause the interfacing network to interrupt normal computer operation. Various control signals in the executive control unit are translated to and from control signals in the computer and external devices to permit the utilization of common instructions.

39 Claims, 16 Drawing Figures

JOHN C. DONALDSON, JR.
INVENTOR

BY Ralph L. Cadwallader
Laurence P. Kaufmann
ATTORNEYS

JOHN C. DONALDSON, JR.
INVENTOR

BY [signature]
[signature]
ATTORNEYS

JOHN C. DONALDSON, JR.
INVENTOR
BY Ralph L. Cadwallader
Laurence A. Bellamy
ATTORNEYS

PROGRAMMABLE COMPUTER-PERIPHERAL INTERFACE

CROSS-REFERENCE TO RELATED APPLICATION

This patent application is a continuation-in-part of application, Ser. No. 886,689, for Programmable Computer-Peripheral Interface, by John C. Donaldson, Jr., filed Dec. 16, 1969, assigned to the same assignee as the present invention now abandoned.

BACKGROUND OF THE INVENTION

1. Field of Invention

This invention generally relates to computer systems and more specifically to the interconnection of external devices and a computer.

2. Description of Prior Art

Digital computers generally operate in conjunction with external devices, called "peripherals," that feed input data into the computers and accept output data from them. Some peripherals, such as punched card or tape readers and process-monitoring instruments, are used only for data input; others, such as line printers and cathode-ray tube displays, may be restricted to output functions; still others, such as magnetic tape and disc units and teletypewriters can be used for both data input and output. A peripheral may even take the form of another computer.

In most cases data cannot, as a practical matter, be transferred directly between a peripheral and the internal computer units where it is to originate or repose. This stems from a number of factors. For example, most peripherals are much slower in operation than a computer and direct transfer of data might unduly waste computer time. Also, voltage levels in a peripheral may be different from those in the computer or the or the information format may be different. Additionally, different control signals are required for different types of peripherals. Thus, the signals directing a magnetic drum unit to deliver a block of data to a computer are different from the signals used to interrogate an instrument monitoring a process parameter.

For these reasons, computers contain input/output sections which serve as "interfaces" between the peripherals and the internal computer units. These sections accommodate disparities in operating speeds, voltage levels, types of control signals and other factors preventing direct connections between peripherals and internal units of the computers.

Still however, peripherals may pose serious operating problems. The input/output section of a computer can accommodate only a relatively small number of types of peripherals; and, as a result, a desirable peripheral is often incompatible with a given computer. Further, the total number of peripherals that can be connected to a computer may be less than the number that one needs to use.

Another important factor is the difference in computer programming for different peripherals. The programmer may have to use substantially different subroutines for the various types of peripherals and even for peripherals of the same type from different manufacturers. This complicates the programmer's task, uses up valuable capacity in the main memory of the computer and requires extensive use of the arithmetic unit of the computer.

In order to minimize the complexity and number of subroutines, certain compromises are often accepted. For example, a system specification or description may limit the number of acceptable peripherals or interfacing characteristics and restrict the capacity of the system. When the word length of a peripheral differs from that of the computer, the subroutine for the peripheral usually involves the acceptance of sacrifices in space or time for the main memory and central processor of the computer. Packing subroutines may be implemented to avoid inefficient memory utilization, but these add to the number and complexity of subroutines.

In another approach to peripheral communication, an auxiliary computer assembles data from either a main computer or the peripherals. Transfers between the main and auxiliary computers are accomplished with a direct memory access mode in which data flows between the main memories of the two computers without passing through registers in the respective central processors. While exceedingly efficient in time-sharing or other systems where large numbers of like peripherals are utilized, this approach is unduly expensive when applied to smaller systems or systems incorporating diverse peripherals. Further, the auxiliary computer in these systems normally communicates with each peripheral by means of a special subroutine. Hence, the various problems previously enumerated are equally applicable to the auxiliary computer approach when the peripheral interfacing characteristics vary.

In still another arrangement for multiple peripheral interfacing, a data input/output port in the computer is connected to a plurality of peripherals in a time-sharing mode of operation controlled by means of various programming techniques. Again, however, a compromise in central processor efficiency is utilized. Specifically, most peripherals in such a system must interrupt the computer operation when they have data to be fed to the computer. Before servicing an interrupting peripheral, the computer must store the contents of all working registers into previously designated and reserved storage locations in main memory so that the computer can eventually resume where it left off in the interrupted program. Moreover, the programming used in this approach to peripheral communication may be and often is limited to a particular computer. Therefore, this arrangement is expensive if use with a number of different computers is contemplated.

Therefore, it is an object of this invention to provide an interface between a computer and diverse peripherals which simplifies computer programming.

Another object is to provide a computer-peripheral interface which uses standardized control and data transfer techniques.

Still another object of this invention is to provide an interface of the above type which minimizes central processor unit time required to transfer data.

A further object of the invention is to provide an interface of the above type which permits data transfers with the computer to be accomplished on a direct memory access basis.

A still further object is to provide an interface in which the control of data transfers is accomplished primarily asynchronously with respect to the computer.

Yet another object of the invention is to provide an interface which expands the number of peripherals the computer can handle.

SUMMARY

Briefly, an interface unit embodying the invention makes use of parallel communication channels between the computer and its peripherals. Two channels are individually designated solely for one-way data transfers between the peripherals and the computer. A third or control channel supervises the data transfer channels. More specifically, the control channel performs a plurality of interrelated functions. In response to computer instruction requesting a data transfer, the control channel sets up the appropriate data transfer channel and connects it to the proper peripheral. As soon as this set-up is completed, the control channel may set up the other data transferring channel. Alternatively, the control channel may concurrently and independently monitor various functions and respond to certain conditions by transmitting information to the computer arithmetic unit in response to the existence of a condition or to a computer instruction. All housekeeping and the related decoding and encoding functions may be carried out independently of and concurrently with single or simultaneous data transfers with the computer.

BRIEF DESCRIPTION OF THE DRAWINGS

For a fuller understanding of the nature and objects of the invention, reference should be had to the following detailed description taken in connection with the accompanying drawings, in which.

DESCRIPTION OF AN ILLUSTRATIVE EMBODIMENT

A. General Discussion

1. Organization

Figure 1:
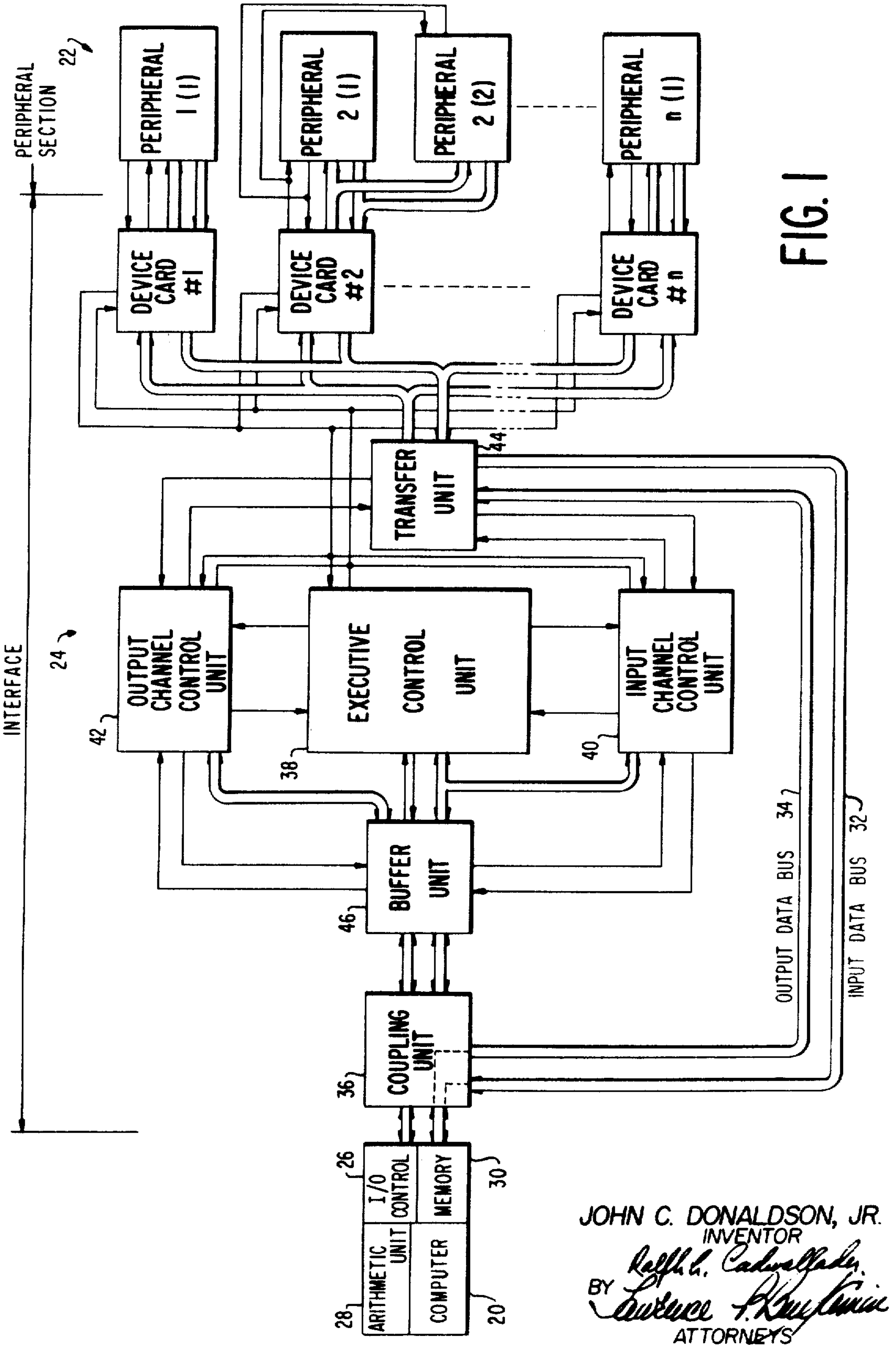
FIG. 1 is a diagram of a computer system incorporating this invention.

In the following description like numerals refer to like elements and circuits throughout. The single lines in FIG. 1 represent control signal transfer paths or wires while the spaced, parallel lines indicate buses or channels. Further, buses and the information on the buses are designated by the same mnemonic; a specific bus or bit of information is designated by a reference numeral immediately following the mnemonic. For example, an executive channel bus of eighteen wires is generally designated as the XC bus. The "zero" wire and the specific bit of information on the zero wire are designated as the XC(OO) wire and the XC(OO) bit respectfully. In addition, the term "input" refers throughout to data or other signals transferred to the computers; the term "output," from the computer.

Basically the system shown in FIG. 1 includes a computer 20 and a plurality of peripherals located in a peripheral section 22. Each peripheral is connected through an interface 24 to the computer 20. Therefore, as will be immediately apparent, the computer 20 effectively "sees" only one "pseudo-peripheral" connected to the input/output control section (I/O control 26) for communication with the arithmetic unit 28. However, the interface 24 is capable of communicating with a plurality of actual peripherals connected on the other side of the interface.

The peripherals in the peripheral section 22 are associated with device cards designated as device card No. 1, device card No. 2 . . . and device card *n*. Each device card serves to interconnect the coupled peripheral and the interface 24 and may be more completely understood by referring to FIGS. 3, 7A and 7B. This connection enables the peripheral and associated device card to communicate normally. For example, a punched tape reader may communicate with device card 01 in eight-bit words while teletypewriters may transfer information with device card No. 2 serially by bit. Certain control functions are performed by the device card in response to computer instructions and some monitoring functions are also implemented by it.

As is evident, more than one like peripheral may be connected with a given card. However, all peripherals associated with a specific device card should have like responses, control function and voltage levels. If a group of like peripherals, such as a group of teletypewriters, are connected to one device card, like device card No. 2, the specific peripheral must be selected. In addition, certain peripherals must be internally addressed, as for example, a magnetic drum connected to device card No. *n*. Internal addressing and peripheral selection are provided by information in the form of an "internal peripheral address." This information is stored in counters found in the device card.

While the number of device cards is arbitrary and dependent upon the system configuration in which the interface 24 is used, eight device cards are often a practical limit. However, this number of device cards standardizes communications with a vast majority of peripherals in a given system and thereby satisfies the objectives of standardization and programming simplicity.

The remaining parts of the interface 24 in FIG. 1 permit data to be transferred directly with a memory 30 in the computer 20. This is commonly known as direct memory access transfer. Two busses, designated as an input data bus 32 and an output data bus 34, are coupled through a coupling unit 36 to the memory 30 in the computer 20 to provide the direct memory access transfers. The coupling unit 36 compensates timing and signal level variations between the computer 20 and interface 24. Such coupling units are well-known in the art, and therefore are not described in detail.

Overall interface supervision is provided by an executive control unit 38 which is coupled to an input channel control unit 40 and an output channel control unit 42. A transfer unit 44 is connected to the data buses 32 and 34, the channel control units 40 and 42 and the device cards. The executive control unit 38 is also connected to a buffer unit 46. Basically, the executive control unit 38 responds to computer commands to set up the input and output channel control units 40 and 42 for data transfers. Thereafter, the control units 40 and 42 control the transfer of data, although they are constantly supervised by the executive control unit 38.

The executive control unit 38 responds to computer issued instructions to monitor various conditions in each device card. The particular conditions are arbitrary and depend upon the system and peripherals. Whenever such a monitoring instruction is received, the executive control unit 38 decodes the computer instruction word, retrieves the condition information and encodes the information for transfer back to the computer arithmetic unit 28.

The executive control unit 38 also is sensitive to classes of interrupting signals. Each interrupting signal generally indicates that data is ready to be transferred, that data being transferred has been or may be lost, that a data transfer has been completed, or that certain peripheral conditions exist. In response to any interrupting signal, the executive control unit 38 encodes an interrupting word, if the interrupting signal has priority over any other operations then in progress, and transfers the interrupting word to the computer arithmetic unit 38 by way of the I/O control 26 for appropriate response. The interrupting word classifies the interrupting signal and indicates the status of each interrupting signal in the class.

Another series of control signals and functions are associated with the buffer unit 46. Whenever an instruction word or other information word is to be transferred between the computer 20 and the interfaces 24, a gate in the buffer unit 46 is energized, and the buffer unit 46 signals either the computer 20 or interface 24 as appropriate to take the instruction or information word. The buffer unit 36 also includes computer memory address counters which coact with the input and output channel control units 40 and 42 to successively designate the memory locations in the computer to which or from which the data is to be transferred. Data transfers between a specified computer memory location and the data buses are intialed whenever the computer and the transfer unit 44 are ready to transfer data.

As previously indicated, both the input and output channel control units 40 and 42 are set up initially by the executive control unit 38. Once each channel control unit is set up, however, it controls the data transfer. By way of example, if a number of data words are to transferred to or from a group or block consecutively addressed storage locations, the number of data words transferred to or from the computer are monitored in the input or output channel control units to stop the transfer when all data has been communicated. Selection circuitry enables a specific computer-selected device card to take part in each operation. When a device card is ready to transfer data with the transfer unit 44, the input or output channel control unit effects the transfer. Various internal interface conditions, which are directly related to the transfer, are monitored by the input or output channel control units. If flexible computer requirements are desired, a computer word-length selector may be provided to control other circuitry in the transfer unit 44.

More specifically, the transfer unit 44 permits single transfers with the data register in each device card. Transfers between computer memory 30 and the transfer unit 44 are based on the number of bits in a memory location, commonly referred to as computer memory word-length, and number of transfers required to load or unload the transfer unit 44 with respect to the computer memory. For example, assume that a device card can store thirty-two bits of data while the computer memory can store only sixteen bits at a given location. If the computer word-length selector indicates that two transfers with the computer memory will be made, the transfer unit 44 selects the first sixteen bits of information in the transfer unit 44 and then, for the next transfer, the last 16 bits.

As previously indicated, the steps for transferring a data block include storing the initial computer memory address, the number representing the size of the data block and the initial internal peripheral address, if appropriate. When the interface transfers a data word, it generates the computer memory address in the buffer unit 46 for transfer to the computer memory address register and transfers the data to that location or from that location through the computer memory buffer on the input data bus 32 or the output data bus 34.

It will now be evident that the objectives of direct memory access data transfers and asynchronous operation are efficiently attained with this approach to data transfers. Once the arithmetic unit 28 of the computer 20 issues a data transfer instruction, the executive control unit 38 sets up the appropriate input or output channel control unit. No further action by the arithmetic unit 28 is required, so the central processor of the computer returns to executing the original program. Program completion is not thereafter interrupted by the data transfer although it is delayed by the number of memory cycles required to make the transfer. Once the executive control unit 38 has set up an input or output channel control unit, it is immediately available to set up the other channel control unit or perform the various monitoring or control functions.

2. Operation

Before describing the detailed structure and operation of certain of the control units and circuits shown in FIG. 1, it will be helpful to briefly define the various operations performed by the interface 24 in conjunction with the computer 20 and peripheral section 22. As previously indicated, data transfers may be computer-initiated. On the other hand, if a device card is ready to transmit data, an interrupting signal is generated; so data transfers may also be initiated by a peripheral. The computer may also interrogate a particular device card to select and monitor one of several conditions or to monitor one of several predetermined sets of conditions. Certain other instructions and functions are provided as described below.

To illustrate operation under various instructions, assume a data block stored at specific, consecutively addressed locations in peripheral $n(1)$ is to be transferred to specific, consecutively addressed memory locations within the computer. Further, assume that the data block is completely identified by defining the location of the initial data word in peripheral $n(1)$ and the number of words in the block. Such a transfer would be encountered, for example, in transferring the contents of a magnetic drum or disc into the random access memory of the computer.

If the peripheral $n(1)$ is a magnetic drum, the drum must be brought up to speed and the read-write head must be properly oriented. This peripheral preparation is provided by programming the computer 20 to generate an INitiate ReaD (INRD) instruction at the I/O control 26. The INRD instruction identifies the device card No. $n$ and, by an immediately following word, the initial address on peripheral $n(1)$. The interface 24 responds to these two words issued in sequence from the computer 20 to start the drum and properly orient the read-write head.

Subsequently, the computer 20 generates another programmed instruction, identified as an INput OPerate (INOP) instruction, to transfer data from the drum. The INOP instruction indicates whether the transfer can be interrupted, defines the number of computer words in an interface word, and identifies the device card to be selected. The INOP instruction also indicates that the next two words to the interface 24 from the computer identify the number of words in a block (i.e., a word count) and the initial computer storage location.

All this information is decoded in the executive control unit 38, which initiates appropriate responses in the input channel control unit 40. The control unit 40 stores the word count and generates control signals in response to the byte size information. These control signals are coupled to the transfer unit 44 to control the number of bits in a data word, the bits being transferred in parallel to the computer memory 30 from the transfer unit 44. The input channel control unit 40 also responds to signals from the executive control unit 38 to enable the computer selected device card.

When the transfer unit 44 is ready to load data from the selected device card into the computer 20, the input channel control unit 40 transfers one computer data word directly into the computer memory 30. Each data word is transferred in parallel onto the input data bus 32 independently of operations in the computer arithmetic unit. During the transfer, the buffer unit 46 and the input channel control unit 40 monitor various conditions relevant to the transfer to assure that relevant data is not lost.

A data block transfer from the computer to a given peripheral is similarly executed by the interface 24 in response to an OUTOP instruction with certain exceptions. For example, a separate peripheral setup instruction analogous to the INRD instruction is not necessary because no data transfers can occur until the peripheral is ready to receive data. Therefore, the function of the INRD instruction can be combined with the other functions of an OUTOP instruction. Unlike the INOP instruction, the issue of an OUTOP instruction does not affect interrupting conditions in the interface 24 defined by the INRD, INOP or other instructions.

Like an INOP instruction, the OUTOP instruction defines the computer word size in relation to the interface word size and identifies the device card to be selected. The OUTOP instruction also indicates whether the next transfers to the interface 24 define the number of words in the data block and an initial computer address. Furthermore, the OUTOP instruction also indicates whether an internal peripheral address will be transferred to the interface 24 from the computer 20.

In response to the OUTOP instruction, the output channel control unit 42 stores the word count; the buffer unit 46, the initial computer address; and the selected device card, the internal peripheral address. When this information is decoded and properly stored, the output channel control unit 42 is ready to transfer data to the transfer unit 44 over the output bus 34 for further transfer to the appropriate device card and peripheral. Subsequent transfers to the peripheral through the transfer unit 44 and the appropriate device card are controlled by the output channel control unit 42 in a manner analogous to the execution of the INOP instruction. Various conditions relevant to the data transfer are also monitored to assure that no information is lost.

The INOP and OUTOP instructions are the primary data transfer instructions. In addition to these instructions and the INRD instruction, the interface 24 shown in FIG. 1 also responds to monitoring instructions from the computer. A SeSNe DeVice (SNSDV) instruction permits monitoring of predetermined conditions for any selected device card. For example, programmable functions such as "end-of-tape" or "-write parity error" may be monitored in response to a SNSDV instruction. When an SNSDV instruction is issued, the executive control unit 38 selects the device card to be monitored and transfers a multiple-bit word representing the predetermined peripheral conditions to the computer I/O control 26.

A Status Request (SR) instruction also provides monitoring of conditions related to the transfer of data or conditions within the interface 24. Although limited to monitoring conditions at specific locations to the interface 24, the SR instruction permits one of diverse monitoring functions to be selected. These functions include identifying the connected device card, the word count or the computer address at the time of the SR instruction, for example.

The interface 24 also responds to certain control instructions. A Take Control Bits (TCB) instruction complements the INRD or OUTOP instruction if additional addressing is necessary. It may also be used to set up discrete conditions within a peripheral such as turning on a punch motor or initiating a tape rewind. The executive control unit 38 decodes a TCB instruction and transfers the information directly to the selected device card.

Another computer instruction, a Transfer Interrupt Enable Profile (TIEP) instruction, is decoded in the executive control unit 38 and defines which of certain interrupting signals may be recognized. More specifically, interrupting signals indicating that data is ready to be transferred from the device cards are masked in response to the TIEP instruction in the executive control unit 38.

The interface 24, in addition to responding to computer-generated instructions must be responsive to interrupting signals from the peripherals. For example, if a given device card is ready to interchange data, the interface 24 must transmit an appropriate signal to the computer 20 to avoid any loss of data and yet maximize the efficiency of the system. Also certain other peripheral conditions and interface condition often must interrupt the program being run in the arithmetic unit. As will be described with reference to FIGS. 4 and 14, the interface 24 responds to interrupting signals by encoding an interrupting word identification for application to the I/O control 26 in the computer 20. The computer may be programmed to respond by issuing one of the above-described data transfer, monitor or control instructions or by taking other appropriate action.

Before going into a more detailed description of the invention, it should be emphasized that the interface 24 in FIG. 1 provides two independent parallel paths or channels for concurrent data interchanges. The third or control channel responds to instruction words from the computer and can simultaneously supervise a data input, a data output and respond to one of several monitoring or controlling instructions. Furthermore, during the actual data transfer, the third channel constantly monitors and oversees the data transfers and responds to various conditions within the transferring peripherals or the interface.

In the immediately following discussion each system element is described without reference to circuit details. Individual circuits not well known in the art are indicated and subsequently described in detail.

B. Detailed Discussion

1. Organization a. Buffer Unit 46

Figure 2:
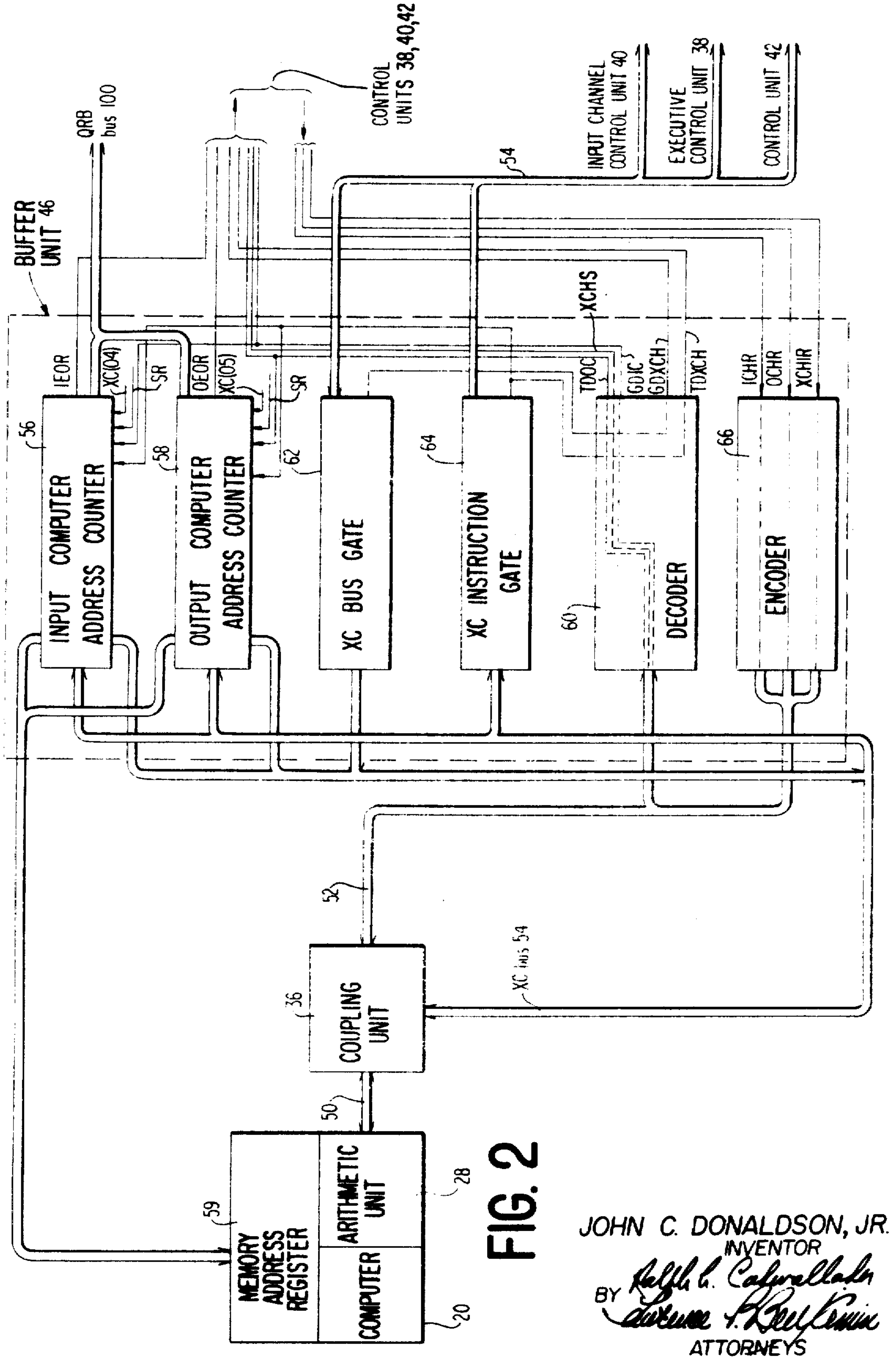
FIG. 2 is a diagrammatic representation of a buffer unit shown in FIG. 1.

The buffer unit 46 is shown in FIG. 2 in relation to the computer 20 and the coupling unit 36. All information may be transferred between a computer 20 and the coupling unit 36 on a bidirectional bus 50 or equivalent transfer means. Another bidirectional bus 52 connects the coupling unit 36 and the buffer unit 46. Still another bus designated as an executive channel (XC) bus 54, connects the coupling unit 36 and the buffer unit 46, to the executive control unit 38, the input channel control unit 40 and the output channel control unit 42 to provide a communications path for each connected unit.

The buffer unit 46 shown in FIG. 2 includes standard counters, gates, encoders, and decoders and is defined in terms of its functional organization. An input computer address counter 56 identifies an initial computer memory storage location into which the data from a peripheral is to be loaded. The counter 56 is loaded in response to an appropriate INOP instruction. An analogous computer address counter 58 is loaded during an OUTOP instruction to identify the initial computer storage location from which data is to be transferred. Both the input and output computer address counters 56 and 58 are normally connected to transfer the address stored therein to a memory address register 59 in the computer.

Utilizing the counters 56 and 58 permits automatic addressing of consecutive storage locations when a data block is to be transferred. Upon completion of each data transfer to the computer, the input computer address counter 56 is incremented to thereby provide the next computer memory address. Simultaneously a decoder 60 in the buffer unit 46 generates a Give Data Input Channel (GDIC) pulse which is coupled to the input channel control unit 40 to acknowledge the completion of the transfer. When the counter 56 signifies that no additional storage positions are available an internal interrupting signal identified as an Input End of Range (IEOR) signal is generated and transmitted to the executive control unit 38.

The output address counter 58 similarly controls the computer address during data output transfers and generates an Output End of Range (OEOR) signal when all available computer memory storage locations are filled. Output data transfers are acknowledged by a Take Data Output Channel (T-DOC) pulse transmitted to the executive control unit 38 and output channel control unit 42 after data has been placed on the output data bus 34.

A Take Data eXecutive CHannel (TDXCH) pulse and a Give Data eXecutive CHannel (GDXCH) pulse are also generated in the decoder 60 in response to the completion of transfers between the XC bus 54 and the coupling unit 36. An XC bus gate 62 and an XC instruction gate 64 are also incorporated in the buffer unit 46. Instructions issued by the computer 20 from the I/O control in the arithmetic unit 28 for the interface are coupled through the XC instruction gate 64. Enabling the instruction gate 64 causes the decoder 60 to generate the TDXCH pulse which acknowledges receipt of the information on the XC bus 54 and which is coupled to the executive control unit 38 and the input and output channel control units 40 and 42. Similarly, when the interface 24 is ready to transfer information to the computer 20, a computer generated signal enables the XC bus gate 62 and the information is transferred to the arithmetic unit 28 by way of the I/O control. The decoder 60 responds and generates the GDXCH pulse which acknowledges transfer of the information on the XC bus 54 to the arithmetic unit 28 in the computer 20.

An encoder 66 in the buffer unit 46 responds to Input CHannel Ready (ICHR), Output CHannel Ready (OCHR) and eXecutive CHannel Interrupt Ready (XCHIR) signals. The ICHR signal indicates that the transfer unit 44 is ready to transfer data to the computer 20. This signal is generated by the input channel control unit 40 (FIG. 1) and causes the encoder 66 to transmit an appropriate signal to the computer 20 or otherwise notify the computer 20 to effect the direct memory access transfer to the computer memory address then specified by the input computer address counter 56. Whenever the transfer unit 44 has completed a data transfer to a device card and is prepared to accept more information from the computer 20, the output channel control unit 42 generates the OCHR signal which effects a similar direct memory access transfer from the computer memory address then specified by the output computer address counter 58. If an XCHIR signal is generated, the encoder 66 interrupts the computer 20 so that the interrupting word from the interface is coupled to the arithmetic unit 28. The XCHIR signal is also used in transferring information back to the computer 20 in response to a monitoring instruction.

Whenever the computer 20 executes an instruction which transfers data from the interface 24 to an accumulator or similar register in the arithmetic unit, the decoder 60 generates an eXecutive CHannel Selection (XCHS) signal. The XCHS signal prevents the executive control unit 38 (FIG. 1) from responding to interrupting condition changes.

These functions of the buffer unit 46 together with the coupling unit 36 translate computer data words and instruction words into interface data words and control words and vice-versa. In this manner, a common data format and common control signals are obtained in the interface 24. Any number of circuits for performing these individual functions exists. Furthermore, the functions of the buffer unit 46 may be performed in other portions of the interface 24. The description of this specific arrangement is therefore intended only to aid in understanding the invention.

b. Transfer Unit 44 and Device Cards

The transfer unit 44 and the device cards perform an analogous translation for the interface 24 and the peripherals. In the illustrative embodiment shown in FIG. 3, data transfers with the memory 30 of the computer 20 are made through the bidirectional bus 50 and the coupling unit 36.

Data generated by a peripheral is loaded into a device card input data register 67. The executive control unit 38 and input channel control unit 40 (FIG. 1) are alerted, and data from the device card is transmitted over a bus 68 to an input channel register 69 in the transfer unit 44. The data is then placed on the input data bus 32 for transfer to the computer memory. As soon as the information is loaded into an input channel register 69, the input data register 67 begins to accept other data from its associated peripheral.

Data to be transferred from the computer 20 is coupled through the bidirectional bus 50 and the coupling unit 36 onto the output data bus 34. From the output data bus 34, the data is coupled to an output channel register 70 and subsequently onto a data bus 71 and to an output data register 72 in the device card connected to the selected peripheral. Each transfer to a selected device card from the transfer unit 44 is initiated after the previous data word has been loaded into the peripheral; each transfer to the transfer unit 44 from the computer 20 is likewise delayed until previous data in the transfer unit 44 is loaded into the device card.

The transfer unit 44, additionally includes a byte controller 76 which controls an input section 74 and an output section 75. As described later, IRSS and ORSS signals applied to the byte controller 76 depend upon the number of transfers with the computer required to load or unload the transfer unit 44. The input section 74 and the output section 75 provide a word size translation so that data transfers with the computer are made as complete computer words. To use the earlier example of a 32-bit interface data word and a sixteen-bit computer data word, the byte controller 76 would set the output section 75 to first load the first 16 bits into an output channel register 70 and thereafter load the other 16 bits. Such byte controllers and circuits for manipulating data bits and otherwise performing the functions of the input and output sections are known in the art and no further explanation is necessary.

Figure 3:
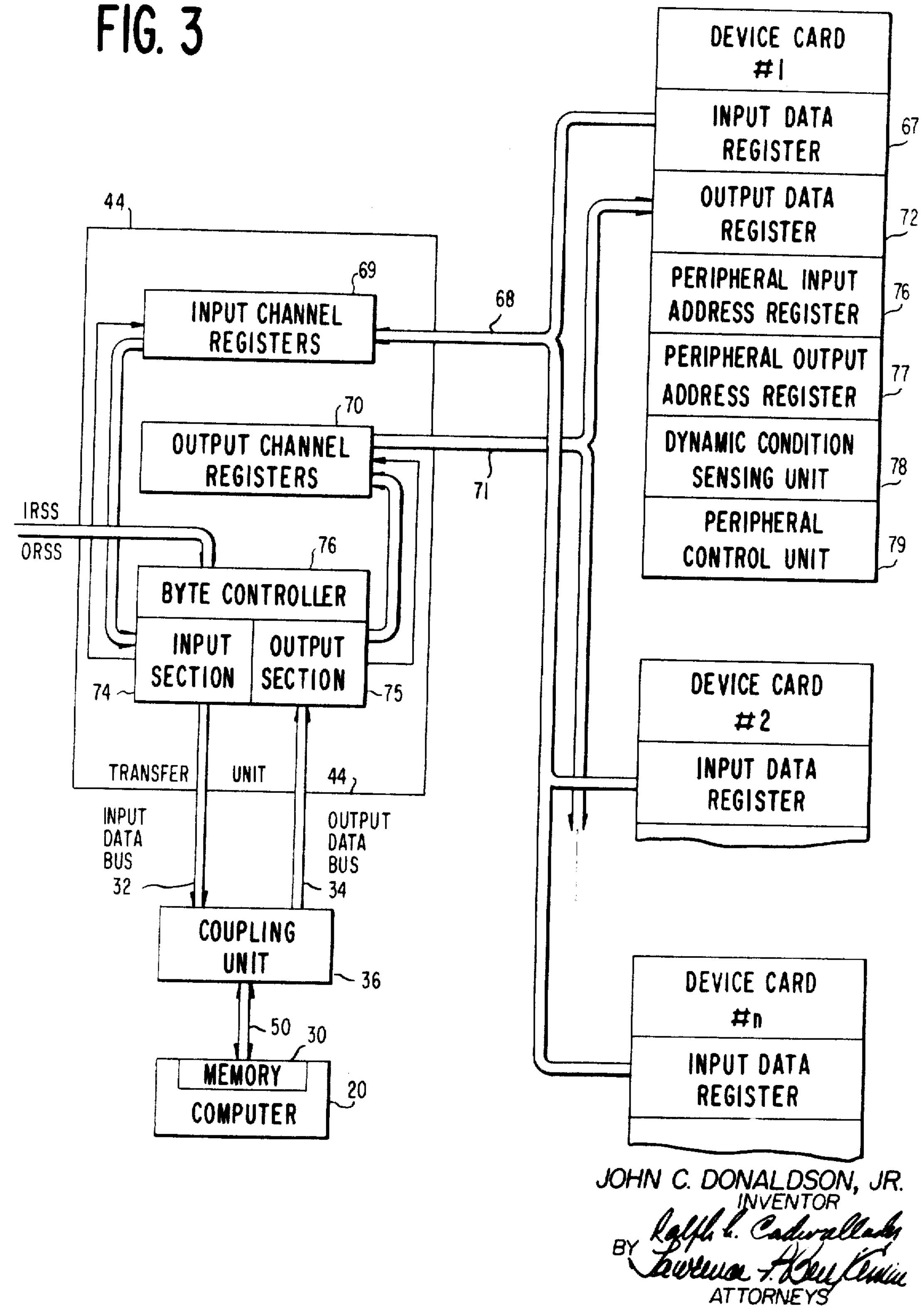
FIG. 3 is a diagram of a transfer circuit and device card shown in FIG. 1.

With further reference to FIG. 3, each device card may include other gates, sensing units and registers. For example, device card number 1 stores internal peripheral addresses in a peripheral input address register 76 and a peripheral output address register 77. Dynamic sensing of peripheral conditions such as the end of a tape in a tape reader or punch or other analogous conditions is provided by a dynamic condition sensing unit 78. Peripheral setup and other control functions, defined by computer instructions decoded in the executive channel, are provided by a peripheral control unit 79. Further details of a device card may be obtained by referring to FIGS. 7A and 7B and the related discussion which describes one embodiment of a device card in detail.

c. Interface Instructions

Figure 4:
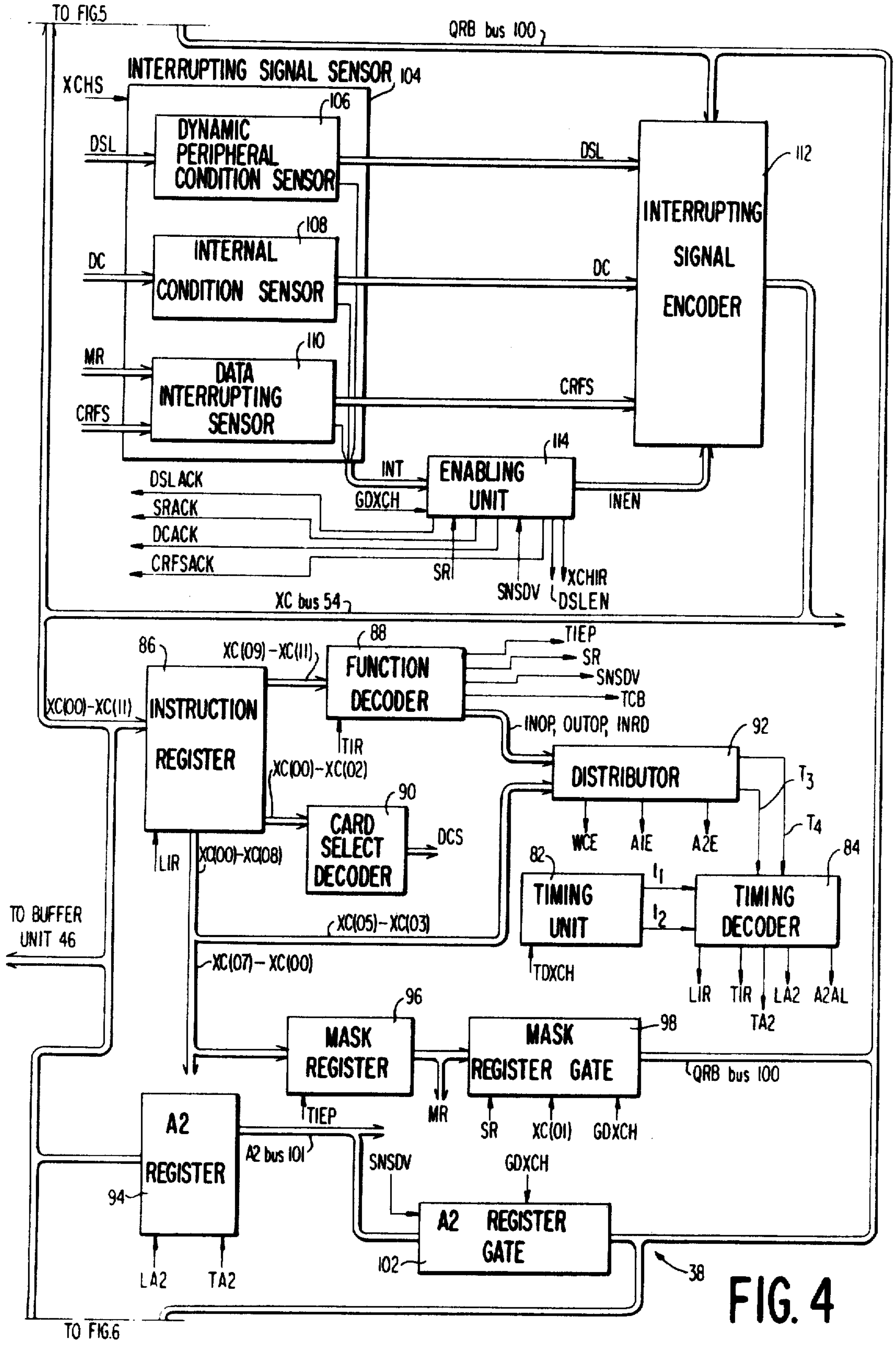
FIG. 4 is a detailed block diagram of the executive control unit shown in FIG. 1.

The foregoing description of the buffer unit 46, the transfer circuit 44 and representative device card will aid in understanding the construction and operation of the executive control unit 38 shown in FIG. 1 and, in detail, in FIG. 4. As previously indicated, the arithmetic unit 28 of the computer (FIG. 1) transmits certain instructions to the interface 24 from time to time. Each instruction has a definite format and is decoded by the interface 24 in order that the peripheral section 22 properly responds to the instruction. As the remaining description depends upon an understanding of the various instruction formats, it will be helpful to describe the instructions in more detail. In the following tables a hyphen (-) represents a bit which can be selectively set to a logical one or zero. Zeroes and ones represent required microcoding for the instruction while blank spaces indicate bits having no significance.

As previously described, the INRD instruction, which sets up a peripheral for a subsequent data transfer to the computer has the format of TABLE 1.

TABLE 1

| Definition | Function | | | Int | | | | | A2 Adr | Device Card Selection | | |
|---|---|---|---|---|---|---|---|---|---|---|---|---|
| Function Defining Code | 0 | 1 | 1 | - | | | 0 | 0 | - | - | - | - |
| Bit Number | 11 | 10 | 9 | 8 | 7 | 6 | 5 | 4 | 3 | 2 | 1 | 0 |

The function code (011 in the most significant bits) identifies the INRD instruction. Multiple functions are defined by the INRD instruction when certain of bits eight through zero are properly microcoded to cause specific responses by the executive control unit 38. While bits six and seven have no significance, bits four and five must be set to zero to assure proper response in the executive channel control unit 38. Setting bit eight permits subsequent interrupting signals to interrupt the operation of the interface 24. Bit three is set if the next word to be loaded from the computer is an internal peripheral address while bits zero, one and two are set to identify the selected device card.

The INOP instruction, shown in TABLE 2, causes data to be transferred into the computer memory.

TABLE 2

| Definition | Function Code | | | Int | Byte Size | | WC | Al | | Device Card Selection | | |
|---|---|---|---|---|---|---|---|---|---|---|---|---|
| Function Defining Code | 0 | 0 | 1 | - | - | - | - | - | 0 | - | - | - |
| Bit Number | 11 | 10 | 9 | 8 | 7 | 6 | 5 | 4 | 3 | 2 | 1 | 0 |

In the microcoded portion, bit eight and bits zero, one and two have the same significance as the respective bits in the INRD instruction. Bits six and seven define the number of computer data words which equal one interface word. When bit five is set, the next word received by the interface 24 from the computer is a word count for the data block. That is, the next word is a number representing the number of words to be transferred. If bit four is set, then a computer memory address will be transmitted by the computer either immediately after the INOP instruction or, if bit five is set, immediately after the word count is transmitted. Bit three must be set to zero to assure proper response in the executive control unit 38.

When data is to be transferred from the computer, the OUTOP instruction is issued by the computer; and it has the format of TABLE 3.

TABLE 3

| Definition | Function Code | | | | Byte Size | | WC | A1 | A2 | Device Card Selection | | |
|---|---|---|---|---|---|---|---|---|---|---|---|---|
| Function Defining Code | 0 | 1 | 0 | | | | | | | | | |
| Bit Number | 11 | 10 | 9 | 8 | 7 | 6 | 5 | 4 | 3 | 2 | 1 | 0 |

With reference to microcoding on OUTOP instruction, bit eight has no significance. Bits seven and six define the number of computer words in an interface word; bit five indicates the next number from the computer is a word count; and bit four, that the following number is the computer memory address from which the data is to be taken. These bits are analogous to the respective bits in the INOP instruction word. Bit three indicates whether the word next following the instruction word identifies an internal peripheral address. The internal peripheral address information from the computer follows the word count, computer memory address or both if generated. Bits two, one and zero define the device card to be selected.

Another instruction, issued to perform certain control functions in the peripheral, is the TCB instruction of TABLE 4 which transmits certain control bits to a device card.

TABLE 4

| Definition | Function Code | | | Control Bits | | | | | | Device Card Selection | | |
|---|---|---|---|---|---|---|---|---|---|---|---|---|
| Function Defining Code | 1 | 0 | 0 | | | | | | | | | |
| Bit Number | 11 | 10 | 9 | 8 | 7 | 6 | 5 | 4 | 3 | 2 | 1 | 0 |

Bits three through eight are microcoded for the specific device card designated by bits zero through two.

A TIEP instruction defines the mask used to control the response to interruptions from device cards ready to transfer data to the computer. Its format is shown on TABLE 5.

TABLE 5

| Definition | Function Code | | | INT | Mask Code | | | | | | | |
|---|---|---|---|---|---|---|---|---|---|---|---|---|
| Function Defining Code | 1 | 0 | 1 | | | | | | | | | |
| Bit Number | 11 | 10 | 9 | 8 | 7 | 6 | 5 | 4 | 3 | 2 | 1 | 0 |

In this instruction, bits seven through zero are microcoded to define the mask. For example, if only bit zero were set, then only device card number 1 could interrupt the program. If all bits were set, all the device cards could interrupt. Bit eight may be used to alter the interruption response in a manner analogous to that defined with reference to the INRD instruction.

Two monitoring instructions may also be issued from the computer. The first monitoring instruction, the SNSDV instruction, is shown in TABLE 6 and causes a predetermined group of status or condition signals to be transferred from a selected device card to the computer.

TABLE 6

| Definition | Function code | | | | | | | | | Device card selection | | |
|---|---|---|---|---|---|---|---|---|---|---|---|---|
| Function defining code | 1 | 1 | 0 | | | | | | | | | |
| Bit number | 11 | 10 | 9 | 8 | 7 | 6 | 5 | 4 | 3 | 2 | 1 | 0 |

With a function code 110 in bits eleven through nine respectively, bits zero through two define the selected device card. No additional microcoding is performed as the information returned to the computer from the selected device card in response to an SNSDV instruction is in a predetermined format.

The second monitoring instruction, the SR instruction, monitors conditions which exist during a data transfer. This instruction has the format shown in TABLE 7.

TABLE 7

| Definition | Function code | | | INT | OWC | IWC | OAI | IAI | ODS | IDS | MR | DSL |
|---|---|---|---|---|---|---|---|---|---|---|---|---|
| Function defining code | 1 | 1 | 1 | | | | | | | | | |
| Bit number | 11 | 10 | 9 | 8 | 7 | 6 | 5 | 4 | 3 | 2 | 1 | 0 |

When the function code 111 is generated, then bit eight performs the same function as it does in the INRD instruction. Only one of the bits zero through seven is additionally set for each instruction. If bit zero is set, then dynamically sensed conditions are retrieved. When bit one is set, the eight-bit mask in the executive control unit 38 is monitored. Setting bit two or bit three produces an identification of the input or output device card then connected to the input or output data bus respectively. The computer memory location to receive the next data input or to provide the next data output is retrieved from input computer address counter 56 or the output computer address counter 58 (FIG. 2) if bit four or bit five is set. If bit six is set, then the present status of the transfer of a block of data as defined by the input word count is transmitted to the computer; setting bit seven retrieves the output word count.

d. Executive Control Unit

When the computer transfers any instruction to the buffer unit 46, the decoder 60 generates the TDXCH pulse to indicate that an instruction has been loaded onto the XC bus 54 by the XC instruction gate 64 (FIG. 2). The TDXCH pulse is applied to a timing unit 82 in the executive control unit 38 shown in FIG. 4. The timing unit 82 normally responds by generating two timing pulses in sequence; these pulses are identified at *t*1 and *t*2. The t1 and *t*2 pulses are applied to a timing decoder 84 which generates, among others, a Load Instruction Register (LIR) pulse and a Transfer Instruction Register (TIR) pulse in time coincidence with the *t*1 and *t*2 pulses respectively. Functionally, the LIR pulse gates the instruction on the XC bus 54 into an instruction register 86 while the TIR pulse enables the output of a function decoder 88. The details of the timing circuit 82 and the timing decoder 84 are shown and discussed with reference to FIG. 9.

A card select decoder 90 immediately decodes the device card selection code defined by signals on the XC(02),XC(01) and XS(00) wires from the instruction register 86. The decoder 90 energizes one of a plurality of output DCS conductors, each DCS conductor being connected to a specific device card. With a three-bit selection code, one wire in an eight-wire DCS bus is energized in response to each selection code. The resulting output signal, a Device Card Selection (DCS) signal, enables the selected device card.

The output of the function decoder 88 is momentarily inhibited until the timing decoder 84 generates the TIR pulse. The delay and its purpose is explained later. One of a plurality of output pulses, which represents the specific function code defined by the combination of signals on the XC(11), XC(10)

and XC(09) wires, is emitted when the TIR pulse is applied to the function decoder 88. These pulses are designated by the same mnemonic which identifies the instruction; that is, in response to a function code identifying an INRD instruction, the function decoder 88 generates an INRD pulse.

If the function decoder 88 generates one of the three transfer related pulses, namely, an INRD, INOP or OUTOP pulse, the decoded pulse is transferred to a distributor 92. In addition, signals on the XC(05), XC(04) and XC(03) wires, which indicate whether a word count, computer address or internal peripheral address is to be subsequently transmitted from the computer are transferred to the distributor 92. If an INOP instruction has the XC(05) or XC(04) bit set, if an OUTOP instruction has the XC(05), XC(04) or XC(03) bit set, or if an INRD instruction has the XC(03) bit set, the distributor 92 takes appropriate action to assure that each following numbers from the computer, which represent a word count, computer memory address or internal peripheral address, are loaded into an appropriate storage device, but not into the instruction register 86.

More specifically, if the XC(05) bit of the INOP instruction or the OUTOP instruction is set, the distributor 92 generates a T3 signal which disables the timing unit 82 and, as a result, the instruction register 86. The distributor 92 also generates a Word Count Enable (WCE) signal which enables an appropriate word counter to receive the following word count from the computer. If a computer memory address is to be transferred to the buffer unit 46, specifically the input computer memory address counter 56 or the output computer memory address counter 58 (FIG. 2), the XC(04) bit of the INOP or OUTOP instruction is set. The distributor 92 responds and generates the T3 signal and a computer address enable signal (A1E) to enable the appropriate computer address counter. If either and INRD or OUTOP instruction has the A2 bit set, the distributor 92 generates a T4 signal and an A2E (A2 register Enable) signal. The T4 signal enables the timing unit 82 to generate the t1 and t2 pulses in sequence, but blocks the generation of the LIR and TIR pulses. However, the timing decoder 84 generates three different pulses when the T4 signal exists. The first, in time coincidence with *t1*, is a Load A2 register (LA2) pulse; the second, in time coincidence with *t2*, is an A2PL pulse; the third, in time coincidence with T4 is a Transfer A2 register (TA2) signal. The LA2 pulse enables an A2 register 94 to load the internal peripheral address when it is placed on the XC bus 54 while the TA2 signal immediately transfers the peripheral address from the A2 register 94 to a register such as the peripheral input address register 76 or the peripheral output address register 77 in the device card (FIG. 3). Details of the distributor 92 are described in the discussion related to FIG. 9.

A mask register 96 in the executive control unit 38 shown in FIG. 4 is connected to selected stages of the instruction register 86 to be loaded with the XC(07) through XC(00) bits of a TIEP instruction. The resulting mask appears on an MR bus 97 to control interface response to interrupting device cards which are ready to transfer data into the computer.

It may also be necessary to transmit the information stored in the mask register 96 back to the computer 20 for various reasons. Such a transfer is accomplished by means of a mask register gate 98. This gate is enabled when the computer generates an SR instruction with the XC(01) bit set. When the SR pulse and XC(01) signal exist simultaneously, a GDXCH pulse from the decoder 60 (FIG. 2) energizes the mask register gate 98 and couples the information on the MR bus to a QRB bus 100 for transfer to the computer.

An A2 register gate 102 connects an A2 bus 101 from the A2 register 94 to the QRB bus 100 under the control of an SNSDV instruction from the computer. The A2 register gage 102 is enabled by the SNSDV instruction, and monitored information is transferred by a GDXCH pulse from the buffer unit 46 (FIG. 2).

With further reference to FIG. 4, the executive control unit 38 is also responsive to various interrupting signals. These interrupting signals may be generated in several ways, as will be described. All the interrupting signals, however, are applied to an interrupting signal sensor 104 which includes a dynamic peripheral condition sensor 106, an internal condition sensor 108 and a data interrupting sensor 110.

Each dynamic sensing unit 78 monitors selected peripheral conditions. When a predetermined condition or conditions occur in any unit 78, the unit attempts to generate a signal onto a Dynamic Sensing Line (DSL) bus. Each unit 78 is arranged in priority. So only the unit 78 with the highest priority can energize the DSL bus if signals energize plural units simultaneously.

When one dynamic condition sensing unit 78 does generate an interrupting signal on the DSL bus connected to the sensor 106, two things happen. First, the DSL signal is passed through the sensor 106 to an interrupting signal encoder 112. Simultaneously, an INTerrupting (INT) signal on the INT bus from the interrupting signal sensor 104 energizes the enabling unit 114. The enabling unit 114 classifies the interrupting signal from the information on the INT bus and generates INTerrupting ENable (INEN) signal on an INEN bus which energizes the interrupting signal encoder 112. A following GDXCH pulse disables the INEN signal and generates a Dynamic Sensing Lines ENabling (DSLEN) signal to prevent changes in the DSL information while it is being transferred to the computer. The combination of the INEN and DSL signals, which also identify the interrupting device card, causes the encoder 112 to transmit an interrupting word over the XC bus 54 to the arithmetic unit in the computer to interrupt the main program under the control of the XCHIR signal from the enabling circuit 114.

The computer may also determine what signals exist on the DSL bus by producing an SR instruction with the XC(00) bit set. When this instruction is received and decoded, the enabling unit again generates the DSLEN signal. At any time before the DSLEN signal is generated, the data on the DSL bus may be varied. For example, a condition may cause a dynamic sensing unit 78 in a device card of higher priority to generate DSL signals. This removed DSL signals generated by the first unit although the unit retains the information for later use. Once the enabling unit 114 generates the DSLEN signal, the the dynamic condition units 78 cannot change the signals in the DSL bus. As described later, any changes in conditions are retained to alter the signals as soon as the DSLEN signal becomes non-assertative.

The internal condition sensor 108 responds to certain conditions within the interface which are common to all data transfers. For example, if the word count in one of the word count registers indicates completion of a transfer of a block of data, either an Input End of Field (IEOF) or an Output End of Field (EOEF) interrupting signal is generated indicating completion of the transfer. An IEOR signal indicates that data has been transferred to all allotted storage locations in the computer memory. Further transfers could destroy other program information stored in the next storage location. For example, assume that a computer has 4,096 storage locations in memory (referred to as a 4K memory). Normally, the low order locations are reserved for operating programs; and the high order locations, for data. If one of the computer address counters identifies the highest order location, the next location to be identified would be the lowest order location. However, at this point an Input End of Range (IEOR) signal is generated to prevent overwriting the low order location with incoming data. An Output End of Range (OEOR) signal prevents reading the information in the low order location as data. Both the OEOR and IEOR signals are generated by the buffer unit 46 (FIG. 3). Other conditions within the interface which could cause data loss produce either an Input Data Abort (IDA) signal or an Output Data Abort (ODA) signal.

Each signal is similar in relation to the operation of the interrupting signal sensor 104, and they are generally designated as DC signals applied to the internal condition interrupt sensor 108 on the DC bus. Details concerning the generation of representative signals can be obtained by referring to the discussion of the word counter shown in FIG. 10 and the controller for the input channel controller shown in FIG. 12 or for the output channel controller shown in FIGS. 13A and 13B.

When a DC signal causes the internal condition sensor 108 to appropriately energize the enabling unit 114 over the INT bus, the resulting INEN pulse and the signals on the DC bus are applied to the interrupting signal encoder 112 to produce an interrupting word on the XC bus 54. This word identifies the source of the interrupting signal and the status of all DC signals.

Figure 7A:
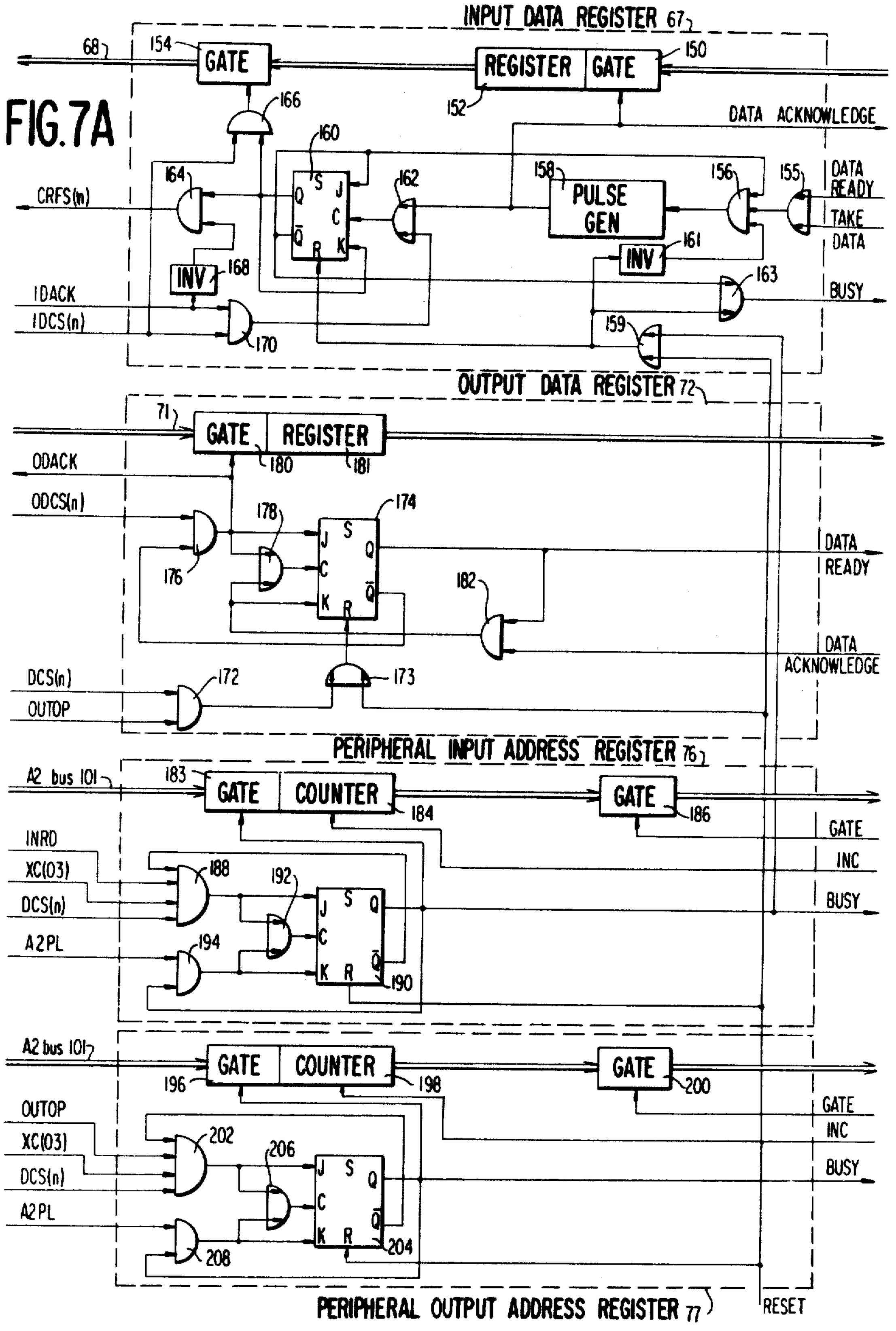
FIGS. 7A and 7B are schematic diagrams showing the details of an illustrative device card.

The data interrupting sensor 110 is energized when a device card is ready to transfer data. This situation is indicated when the input data register 67 in FIG. 3 generates a CRFS signal if the mask signals coupled to the sensor 110 by the MR bus coincide with the CRFS signal, the interrupting signal is recognized. The circuitry for generating the CRFS signal is shown in FIG. 7A. Coincidence circuits for analyzing the MR and CRFS signals are shown and described in detail with reference to FIG. 14.

When there is coincidence, all CRFS signals are gated to the interrupting signal encoder 112 to be coupled onto the XC bus 54 as an interrupting word in response to an INEN signal. As will be described later, signals from a device card transferring data under the control of an INOP instruction normally are not allowed to interrupt computer operation.

Figure 6:
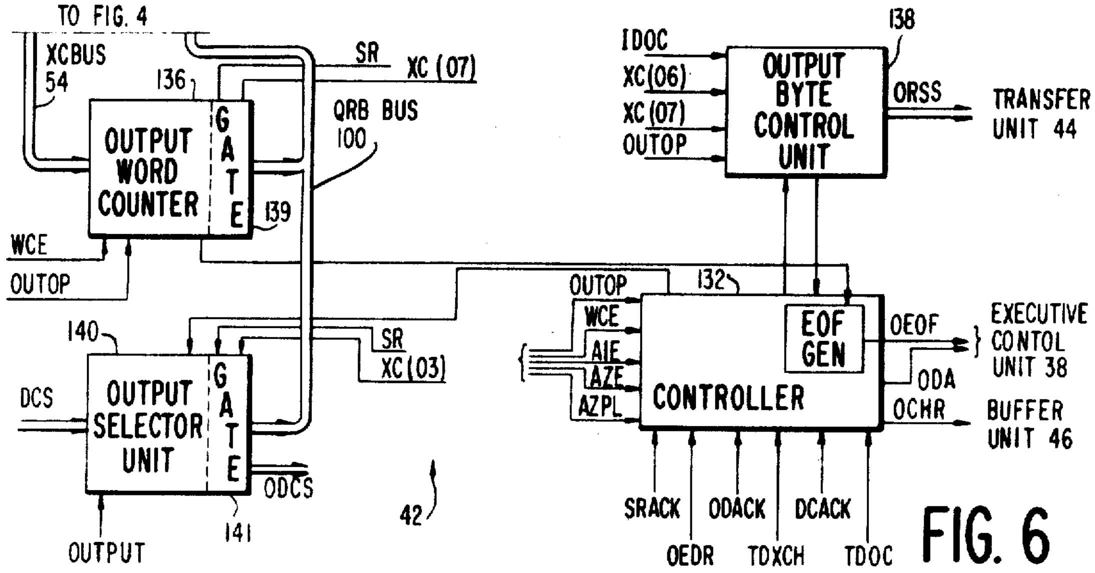
FIG. 6 is a detailed block diagram of the output channel control unit shown in FIG. 1.

The remaining operation of the interface 24 shown in FIG. 1 includes interaction between the executive control unit 38 (FIG. 4), the input channel control unit 40 (FIG. 5) and the output channel control unit 42 (FIG. 6). Therefore it is necessary to refer to details on each FIGURE throughout the following description. As the schematics for each unit are located on separate sheets to clearly illustrate the circuit details, it is suggested that the three sheets of drawing be placed adjacent one another to facilitate understanding the following description.

e. Input Channel Control Unit 40

Figures 5, 8:
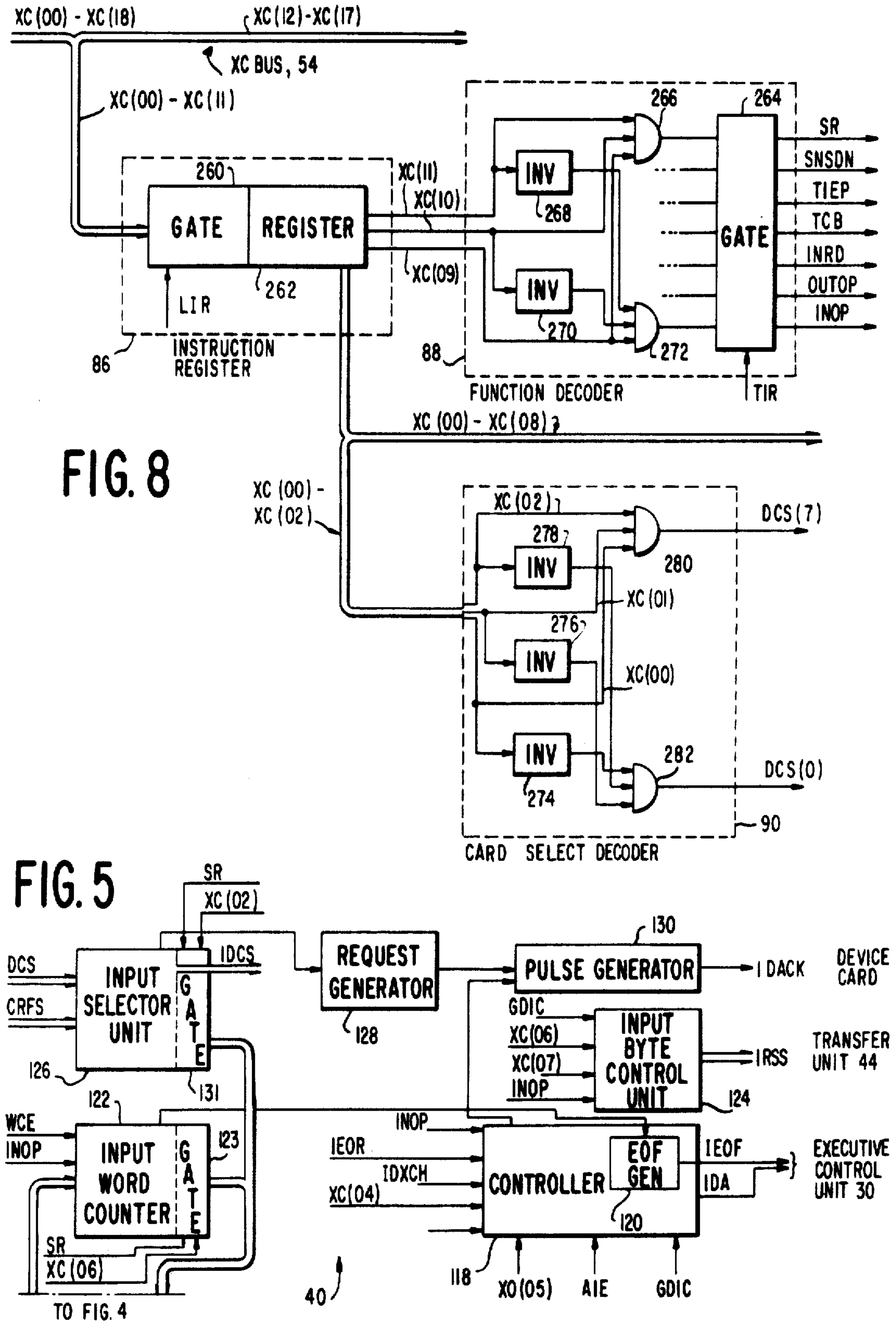
FIG. 5 is a detailed block diagram of the input channel control unit shown in FIG. 1.
FIG. 8 depicts an instruction register, a function decoder, and a card select decoder shown in FIG. 4.

The input channel control unit 40 shown in FIG. 5 comprises a controller 118 containing an end-of-field (EOF) generator 120. The controller 118 responds to various signals from the buffer unit 46 (FIG. 2) and the executive control unit 38. In response to these input signals, the controller 118 generates signals which are coupled to the executive control unit 38, the buffer unit 46 and other portions of the input control unit 40.

If an INOP instruction is issued by the computer and loaded into the instruction register 86 with the XC(05) bit set, thereby indicating a block transfer of data, the distributor 92 generates the WCE signal to load the next information word on the XC bus 54 into an input word counter 122, described in detail with reference to FIG. 10. The counter 122 is incremented for each transfer of an interface data word from a device card until it indicates that all has been transferred. When this occurs, the IEOF signal from the EOF generator 120 is coupled to the internal condition sensor 108.

When it is necessary to determine the status of the transfer, an SR instruction is issued with the XC(06) bit set. The word count at that time is then loaded through a gate 123 onto the QRB bus 100 for transfer to the arithmetic unit in the computer.

An input byte control unit 124 in the input control unit 40 responds to the XC(06) and XC(07) bits in an INOP instruction which identify the number of computer word transfers required to unload a data word stored in the input channel register 69 and, with subsequent GDIC signals, produces identifying IRSS signals. IRSS signals are transferred to the byte controller 76 (FIG. 3) to control the input section 74. This circuit is analyzed in more detail in the discussion referring to FIG. 11.

An input selector unit 126 responds to the signals on the DCS bus from the card select decoder 90 to transmit, in response to an INOP instruction, an Input Device Card Select (IDCS) signal to a device card selected by the computer instruction. Whenever a selected device card is thereafter ready to transmit information, it generates the CRFS data interrupting signal which is coupled back to the input selector unit 126 and the data interrupting sensor 110. However, as previously indicated, the data interrupting sensor 110 need not and normally does not react to any CRFS signals from the device card designated by the INOP instruction. Rather the input channel control 40 responds. Specifically a request generator 128 issues a delayed request to a pulse generator 130 to control the data transfers. Various signals from the controller 128 may inhibit the pulse generator 130. However, if no inhibiting occurs, the pulse generator 130 produces an IDACK (Input Data ACKnowledge) pulse which acknowledges the transfer from the device card to the transfer circuit 44 (FIG. 3).

The pulse generator 130 may be inhibited, for example, while the input word counter 122 or input computer address counter 56 is being loaded as indicated by a TDXCH pulse or while the request generator 128 is activated. If the data bus 32 (FIG. 1) is being read as indicated by a GDIC pulse or if the executive control unit 38 receives another INOP instruction as indicated by an INOP pulse, the pulse generator 130 is also inhibited. The details of an illustrative inhibiting circuit for the pulse generator discussed with reference to FIG. 12.

An input selector unit gate 131 between the input selector unit 126 and the QRB bus 100 permits identification of the device card connected to the input data bus 32 (FIG. 1) at that time. If a device card is connected to the input data bus 32, one line of an IDCS bus is set. If an SR instruction is issued by the computer with the XC(02) bit set, the signals on each IDCS bus are transferred onto the QRB bus 100. As will be evident only the one wire in the QRB bus connected to the set IDCS bus is energized. The resulting signal is then coupled through the interrupting signal encoder 112 and onto the XC bus 54, and the interrupting word contains eight information bits. Only one bit is set.

The controller 118 shown in FIG. 5 responds to several of the previously discussed signals and other signals to control the operation of the remaining units in the input channel control unit 40. For example, the IEOR signal and other conditions from the input channel control unit 40 which produce the IEOF or IDA signals, cause the controller 118 to stop a data transfer then in progress. The XC(05) signal, together with the generation of the INOP pulse and TDXCH pulse disable the pulse generator 130 while enabling the word counter 122. Both the A1E signal from the distributor 92 and the XC(04) signal inhibit the pulse generator 130 while an initial computer address is being loaded into the buffer unit 46.

In response to these various signals and input channel control unit indications, the controller 118 generates the IEOF signal, the IDA signal and an Input CHannel Ready (ICHR) signal. The IDA signal indicates that data is being lost. The ICHR signal indicates that the transfer unit 44 has data and is ready to transfer that data to the computer. Both the IEOF and IDA signals are transferred to the internal condition sensor 108; the ICHR signal is transferred to the buffer unit 46. Timing and generation of these signals may be more fully appreciated by referring to FIG. 12 and the related discussion.

f. Output Channel Control Unit 42'

The output channel control unit 42 shown in FIG. 6 comprises a controller 132 including an EOF generator 134, an output word counter 136, an output byte control unit 138 and an output selector unit 140. In response to various internal signals and signals from the buffer unit 46 and the executive control unit 38, the controller 132 generates signals which are coupled to the buffer unit 46 and the executive control unit 38.

When an OUTOP instruction from the computer is loaded into the instruction register 86 with the XC(05) bit set thereby indicating a block transfer of data from the computer, the distributor 92 generates the WCE signal during the next information word on the XC bus 54 to enable the loading of the output word counter 136. The counter 136 is analogous in construction to the input word counter 122 described in detail with reference to FIG. 10. It is loaded by the combination of the WCE signal, and OUTOP and TDXCH pulses. When the data transfer is complete, the OEOF signal from the EOF generator 134 is coupled to the internal condition sensor 108. When it is necessary to determine the status of the transfer, an SR instruction with the XC(07) bit set is issued. The word count is then transferred through a gate 139 onto the QRB bus 100 for transfer to the arithmetic unit in the computer.

The output byte control unit 138 in the output channel control unit 42 responds to the XC(06) and XC(07) bits in an OUTOP instruction which identify the number of transfers required to completely load the output channel register 70. In addition, subsequent TDOC pulse enable the output byte control unit 138 to generate ORSS signals. The ORSS signals are transferred to the byte controller 76 (FIG. 3) to control the output section 75. This circuit is analogous to the input byte control unit 124 which is discussed in detail in FIG. 11.

The output selector unit 140 responds to the DCS signals from the card select decoder 90 to transmit, in conjunction with an OUTOP instruction and other signals, an appropriate Output Device Card Select (ODCS) signal to a selected device card when the transfer unit 44 is ready to transmit data. A gate 141 between the output selector unit 140 and the QRB bus 100 permits identification of the device card connected to the output data bus 34 (FIG. 3). If an SR instruction is issued by the computer with the XC(03) bit set, one line of the QRB bus 100, which represents the selected device card, is set. The resulting signal is then coupled through the interrupting signal encoder 112 and onto the XC bus 54.

The controller 132 responds to the OUTOP pulse from the function decoder 88, the WCE, A1E and A2E signals from the distributor 92 and the A2PL pulse from the timing decoder 84 to generate an Output CHannel Ready (OCHR) signal which indicates that the output data bus 34 and the transfer unit 44 (FIG. 3) are ready to receive data from the computer. An Output Data ACKnowledge (ODACK) pulse from a device card indicates that the device card has accepted data from the transfer unit 44. The ODACK pulse, when applied to the controller 132, disables the ODCS signal and increments the output word counter 136. An OEOF signal or ODA signal, which are analogous to the IEOF and IDA signals respectively, or the OEOR signal from the buffer unit 46, which is analogous to the IEOR signal, are connected to the internal condition sensor 108. Any one of these signals causes the controller 132 to stop the data transfer. The OCHR signal is coupled to the buffer unit 46. Timing and generation of these signals may be more fully appreciated by referring to FIG. 13 and the related discussion.

2. Interface Operation

Now the various operations of the interface 24 can be analyzed with reference to FIGS. 2 through 6. Responses to computer-issued instructions and interrupting signals are discussed in terms of a hypothetical program being run in the computer.

a. Data Transfer Instructions

Referring to the earlier example wherein a data block was to be transferred from a drum into computer memory, the first instruction, which a programmer must write in utilizing the interface of this invention, is the INRD instruction. The specified device card is identified by the XC(02), XC(01) and XC(00) bits of the INRD instruction. Normally an internal drum address is required, so the programmer writes the INRD instruction with the XC(03) bit set and then programs the computer to issue the internal address as the next communication to the interface 24. Bit eight may be set or not set to alter the existing interrupting signal response characteristics.

The programmer includes an INOP instruction for the same device card later in the program. Normally the XC(04) and XC(05) bits are set and the program is written so the next two words issued by the computer for the interface 24 are the word count and the initial computer memory address in that order.

During execution of the program by the computer, the programmed INRD instruction is loaded from the arithmetic unit 28 and through the XC instruction gate 64 (FIG. 2) to the executive control unit 38. The decoder 60 issues the TDXCH pulse which is applied to the timing unit 82 (FIG. 4) and the INRD instruction is loaded into the instruction register 86 by the LIR pulse from the timing decoder 84. A DCS signal is generated immediately by the card select decoder 90 and is coupled to the selected device card directly as an enabling signal. The subsequent TIR pulse couples the INRD pulse from the function decoder 88 to the distributor 92. As the TIR pulse terminates, the distributor 92 produces the A2E and T4 signals. When the next word is transferred to the interface 24, the TDXCH pulse from the buffer unit 46 (FIG. 2) loads the internal peripheral address into the A2 register 94 and through the A2 bus 101 to the peripheral input address register 76 (FIG. 3). This transfer is controlled by the LA2 and A2PL pulses and the TA2 signal from the timing decoder 84.

After a programmed time delay dependent upon the time required for the peripheral to respond to the INRD instruction, the arithmetic unit issues the INOP instruction. This INOP instruction is initially loaded into the instruction register 86 through the XC instruction gate 64 by the LIR and TIR pulses from the timing decoder generated in response to a first of three consecutive TDXCH pulses. When the INOP instruction is loaded into the instruction register 84, the device card selection bits, the XC(00), XC(01) and XC(02) bits, enable the selected device card through the card select decoder 90. Card selection is completed when the TIR pulse causes the function decoder 88 to produce the INOP pulse which is coupled to the input selector unit 126 (FIG. 5) to produce an IDCS signal.

As a word count and a computer address are to be transferred, the INOP pulse from the function decoder and the XC(04) and XC(05) bits in the instruction set up the distributor 92 so that the WCE and A1E signals are generated sequentially with the next two TDXCH pulses. The second TDXCH in the three-pulse sequence transfers the word count into the input word counter 122. The third TDXCH pulse loads the input computer memory address into the input computer address counter 56 (FIG. 2).

As only one data channel for transferring data to the computer from the transfer unit 44 exists, transfers in response to an INOP instruction will usually have priority over all other data interrupting signals. Therefore, the enabling unit 114 may be rendered insensitive to all CRFS interrupting signals by generating an appropriate TIEP instruction before the INOP instruction. If it is desirable to recognize other CRFS interrupting signals, another TIEP instruction which masks off CRFS interrupting signals from the selected device card can be issued.

At this instant in time, a control channel constituted by portions of the executive control unit 38 and the buffer unit 46 has set up a data transfer channel including the input channel control unit 40, portions of the buffer unit 46 and the transfer unit 44. Specifically one device card has been selected, the word counter 122, the input computer address register 56 and the peripheral input address register 76 have been loaded and the enabling unit 114 is set to be responsive to DSL, DC and other, optional CRFS interrupting signals, the response to CRFS interrupting signals being defined by the mask. No information transfer has occurred, however.

The selected peripheral begins transferring data to the input data register 67 (FIG. 3) from the selected drum location. When the input data register 67 is full, the device card generates a CRFS signal on one wire of the CRFS bus. While the interrupting signal sensor 104 and enabling unit 114 cannot respond, the input selector unit 126 does by enabling the delayed interrupt request generator 128 and transferring the data onto the bus 68 (FIG. 3). If the previously defined inhibiting conditions are met indicating that the transfer can be made, the request generator 128 energizes the pulse generator 130. The resulting IDACK pulse from the generator 130 loads the input channel register 69 with the data on the bus 68.

The ICHR signal, generated in response to the IDACK pulse, indicates that the input channel register 69 is loaded and is coupled to the buffer unit 46. The number of transfers from the input channel register 69 to the computer memory is determined by decoding the XC(06) and XC(07) bits of the INOP instruction in the input byte control unit 124. Assuming that a word transferred to memory is to have sixteen bits and that the XC(06) and XC(07) bits indicate that two transfers will be made, the input byte control unit 124 causes the byte controller 76 to transfer the first 16 bits onto the input data bus 32.

With the data on the input data bus 32 and the computer address simultaneously available, the data is loaded into the selected memory location with one memory cycle or pulse. The program being executed in the arithmetic unit is merely delayed by the one memory cycle. No working registers in the arithmetic unit are stored. Therefore, the interface has controlled the transfer independently of the arithmetic unit operation and has provided a data transfer directly to the computer memory.

When the computer loads the data into the specified address, the buffer unit 46 generates the GDIC pulse in the decoder 60 (FIG. 2) to acknowledge the transfer of the first 16 bits stored in the input channel register 69. The GDIC pulse also increments the input computer address counter 56. As a result the ICHR signal enables the transfer of the next sixteen-bit computer data word from the input channel register 69 to the next computer location. Taking the last computer data word from the input channel register 69 is sensed by the controller 118 to increment the word counter 122 as described later.

When the next word is loaded into the input data register 67, another CRFS signal is generated and the entire operation is repeated. Premature response and loading of the register 69 is prevented by inhibiting the pulse generator 130 until the data in the register 69 is completely transferred. This operation continues, independently of arithmetic unit operation until the EOF generator 120 indicates an End of Field Condition, the buffer unit 46 indicates an End of Range Condition or a superceding INOP instruction is generated.

As will be evident, inputs of single data words or blocks of data from each peripheral connected to the interface 24 are handled similarly by appropriate inclusion of microcoded INRD and INOP instructions. Several addition advantages are realized. For example, diverse subroutines are not required. Considering the most complex transfer, that of a data block from a specified sequence of internal peripheral addresses to a block of computer addresses, the arithmetic unit of the computer communicates with the interface only five times to load the interface with the INRD instruction, the initial internal peripheral address, the INOP instruction, the word count and the initial computer memory address. Actual data transfers are controlled by the input channel control unit 40 and portions of the transfer unit 44 and buffer unit 46. Further, once the input channel control unit 40 has been set up, the executive control unit 38 is free to perform any other function.

Data transfers from computer memory to a peripheral are handled in an analogous fashion. Assume that the program includes a subroutine which stores data in a block of memory locations. If the programmer wants to transfer this data to the previously mentioned magnetic drum, an OUTOP instruction is microcoded by setting the XC(07) and XC(06) bits to define the number of transfers required to fill the output channel register 70 and by setting the XC(02), XC(01) and XC(00) bits to identify the device card. The programmer also sets the XC(05), XC(04) and XC(03) bits and then programs the computer to issue the word count, computer memory address and the internal peripheral address in succession to the interface 24.

When the microcoded OUTOP instruction is loaded into the instruction register 86 through the XC instruction gate 64 by the LIR pulse, the device card is immediately selected by the card select decoder 90. When the TIR pulse from the timing decoder 84 enables the function decoder 88 to produce the OUTOP pulse, the distributor 92 is set up to produce the WCE, A1E and A2E signals sequentially with the next three TDXCH pulses. As the word count, computer address and the internal peripheral address are each loaded onto the XC bus 54 by the XC instruction gate 64, the distributor 92, timing unit 82 and timing decoder 84 coact to load the information into the output word counter 136, the output computer address counter 58 (FIG. 2) and the peripheral output address register 77 (FIG. 3). In addition, the OUTOP pulse permits the executive control unit 38 to enable a device card for an output operation and the output byte control unit 138 to generate an ORSS signal (FIG. 6) for transfer to the byte controller 76 (FIG. 3).

Assuming that the output channel register 70 is cleared, the OUTOP instruction sets up the output channel control unit 42; and the controller 132 (FIG. 6) generates the OCHR signal. In response, the encoder 66 (FIG. 2) causes the output data buS 34 to be loaded with the first data word from the memory 30. The decoder 60 generates the TDOC pulse to acknowledge the transfer of data and load the output channel register 70 through the output section 75 under the control of the ORSS signals. The TDOC pulse also advances the output computer address counter 58 and affects the output byte control unit 138. If a 16-bit word is issued, for example, then the leading edge of the first TDOC pulse loads the data into the first sixteen stages of the output channel register 70; a second TDOC pulse causes the data from the next computer memory location to be loaded into the last sixteen stages. The output byte control unit 138 senses when the output channel register 70 has been completely loaded and disables the OCHR signal thereby blocking further transfers from the computer. When this occurs, the controller 132 and the output selector unit 140 generate an ODCS signal to indicate that the output channel register 70 is loaded. The ODCS signal is applied to the output data register 72 to load the data from the output channel register 70. When the output data register 72 is loaded, the ODACK pulse is generated and coupled to the controller 132 to disable the ODCS signal until a new word is loaded into the output channel register 70. In addition, the ODACK pulse causes the output word counter 136 to be advanced. Loading the output data register 72 from the output channel register 70 enables the controller 132 to generate another OCHR signal and begin the next transfer from the computer over the output data bus 34 (FIG. 3).

b. Control Instructions

As previously described, the TCB instruction might be micro-coded to start a tape rewinding mechanism, turn on a punch motor or perform other discrete functions. In addition, where a plurality of peripherals are connected to one device card and each has internal addressing requirements, the TCB instruction may complement the INRD and OUTOP instructions to provide the additional addressing. A TCB instruction, when decoded by the instruction register 86, has no effect on either the input channel control unit 40 or the output channel control unit 42. The coincidence of a TCB pulse from the function decoder 88 and the DCS signal from the card select decoder 90 enable the peripheral control unit 79 (FIG. 3) with bits XC(03) through XC(08). As this instruction is executed solely by the executive control unit 38, it can be executed concurrently with and independently of either a data input or data output operation.

A programmer uses a TIEP instruction to alter the response characteristics of the data interrupting sensor 110. The eight mask bits, the XC(00) through XC(07) bits, are individually set to enable the associated device card to interrupt the program when data is ready to be transferred. For example, a program would contain a TIEP instruction before an INOP instruction to alter the response of the data interrupting sensor 110.

When the instruction register 86 is loaded with a TIEP instruction from the XC instruction gate 64 by the timing unit 82 and the timing decoder 84, the function decoder 88 generates the TIEP pulse and loads the eight-bit mask into the mask register 96. As soon as the mask register 96 is loaded, the eight-bit mask appears on the MR bus and immediately alters the response characteristics of the data interrupting sensor 110 to CRFS signal.

c. Monitoring Instructions

The SNSDV instruction immediately takes priority over all interrupting signals to transfer a predetermined six-bit profile from a selected device card to the computer. As the profile is predetermined, only bits XC(11) through XC(09), the function code, and bits XC(02) through XC(00), the card selection code, are microcoded in the SNSDV instruction. The decoded SNSDV pulse and DCS signal enable signals from the dynamic sensing unit 78 (FIG. 3) to be loaded onto the A2 bus 101 (FIG. 4). Simultaneously, the SNSDV pulse enables the A2 register gate 102 to transfer the signals onto the QRB bus 100. The enabling unit 114 and the interrupting signal encoder 112 respond to transfer the six-bit profile onto the XC bus 54 while the enabling unit also generates an eXecutive CHannel Interruption Ready (XCHIR) signal. The XCHIR signal is coupled to the computer arithmetic unit 28 by the encoder 66 (FIG. 2). When the information has been transferred through the XC bus gate 62, the decoder 60 generates a Give Data eXecutive CHannel (GDXCH) pulse. The GDXCH pulse is applied to the enabling unit 114 to generate a DCACK pulse which disables the A2 register gate 102.

Another available instruction, the SR instruction, permits various functions related to a data transfer to be analyzed and also takes priority over all interrupting signals. When an SR instruction is loaded into the instruction register 86, the function decoder 88 generates the SR pulse. This signal is then transmitted to the word counters 122 and 136 and the selector units 126 and 140 (FIGS. 5 and 6), the computer address counters 56 and 58 (FIG. 2), the mask register gate 98 (FIG. 4) and the enabling unit 114. The specifically desired information is obtained by microcoding one of the XC(00) through XC(07) bits as previously described.

As indicated, the SR pulse is applied to the enabling circuit 114 to perform three functions. When the XC(00) bit is set, the interrupting signal encoder 112 loads the signals on the DSL bus onto the XC bus 54 and the enabling unit 114 generates the DSLEN signal. The DSLEN signal is initiated in coincidence with the leading edge of the GDXCH pulse. The DSLEN signal is independently generated and terminates after the GDXCH pulse terminates. For other SR instructions, the interrupting signal encoder 112 encodes the information on the QRB bus 100 into an interrupting word which is placed on the XC bus 54. Finally, the enabling unit 114 generates the XCHIR signal and the SRACK pulse to control the transfer of the interrupting word to the computer. When the SR instruction has the XC(00) bit set, the XCHIR signal is coupled to the encoder 66 (FIG. 2). When the interrupting word is accepted by the computer, the GDXCH pulse from the decoder 60 causes the enabling unit 114 to produce the SRACK pulse to acknowledge the status request and to reset the gate which transfers the information onto the QRB bus 100. A DSLACK pulse is also generated in time coincidence with the SRACK pulse.

If the XC(07) bit of an SR instruction were set, the controller 132 (FIG. 6) would enable the gate 139 to energize the QRB bus 100 with the word count. The resulting SRACK pulse, which is applied to all gates adapted to couple information onto the QRB bus 100, disables the gate 139. Setting the XC(06) bit produces an analogous response with the input word counter 122. If either the XC(05) bit or XC(04) bit is set, a gate associated with the output computer address counter 58 or the input computer address counter 56 (FIG. 2) respectively is enabled to load the address directly onto the QRB bus 100 for transfer to the computer. Setting either the XC(03) bit or XC(02) bit couples either the ODCS signals or IDCS signals from the output selector unit 140 (FIG. 6) or the input selector unit 126 (FIG. 5) onto the QRB bus 100. When the XC(01) bit is set, the mask register gate 96 transfers the contents of the mask register 94.

d. Interruptions

As previously indicated, the interrupting signal sensor 104 responds to signals which appear, from time to time, on the DSL, DC and CRFS buses. When interrupting signals exist on any of the buses, the energized sensors each place a signal on the INT bus to be recognized by the enabling unit 114 in priority unless the decoder 60 (FIG. 2) generates the XCHS signal. The remaining responses are given to DSL, DC and CRFS interrupting signals in that order.

If neither an SR nor SNSDV instruction has been decoded, the INT signal with the highest priority is recognized and the enabling unit 114 generates the XCHIR signal and an INEN signal. The INEN signal identifies the selected one of the sensors 106, 108 or 110 and is encoded onto two wires such as the XC(10) and XC(11) wires of the XC bus 54 to identify the class of interrupting signals. Signals on the recognized bus are simultaneously loaded onto the XC(00) through XC(09) wires as appropriate by the interrupting signal encoder 112. Hence, the interrupting signal encoder 112 generates an interrupting word which identifies the class of the interrupting signals and the status of all interrupting signals in the class.

All interrupting words generated by the interrupting signal encoder 112 are transferred to the computer in the same manner. The XCHIR signal from the enabling unit 114 is transferred to the encoder 66. When the computer recognizes the signal from the encoder 66, it enables the XC bus gate 62, transfers the information on the XC bus 54 to the arithmetic unit. Once the interrupting word is loaded into the arithmetic unit, the computer 20 may service the interrupting condition. Such servicing may include the execution of the monitoring and controlling instructions previously described.

In addition to generating the XCHIR signal, the enabling circuit 114 produces an acknowledgement pulse in response to the GDXCH pulse. A Status Request ACKnowledge (SRACK) pulse is generated in response to SR or SNSDV instructions. When a DSL wire interrupts the computer, the enabling circuit 114 generates a DSLACK pulse. Servicing a DC or CRFS interrupting signal produces a DCACK or a CRFSACK pulse respectively.

The DCACK signal is applied to the input controller 118 (FIG. 5) and the output controller 132 (FIG. 6) to reset portions of each controller which respond to DC signals. For example, the DCACK pulse resets circuitry in the controller 118 set by the IEOF or ID A signal. The leading edge of the DCACK pulse also produces a DSLEN signal. The SRACK pulse disables any gate previously enabled by an SR instruction. The CRFSACK pulse which is also generated in time coincidence with the GDXCH pulse, resets a portion of the enabling circuit 114 so that a subsequent CRFS interrupting signal is not recognized until a subsequent TIEP instruction is issued. DSLACK pulses reset signal generators in the dynamic sensing unit 78, described with reference to FIG. 7.

In summary, the interface 24 shown in FIG. 1 is primarily controlled by the circuits shown in FIGS. 4, 5 and 6. The executive control unit 38 shown in FIG. 4 responds to either programmed computer instructions or interrupting signals. Programmer computer instructions coupled to the interface define a particular function and, through microcoding, other operating information. These instructions are decoded in the executive control 38 to set up the input channel control unit 40 and output channel control unit 42 if a data transfer is involved. Other instructions transfer information to a peripheral or other portions of the interface to obtain or alter the status of predetermined conditions. If certain monitored conditions occur, an interrupting signal is generated and the interface determines whether the interrupting signal will be recognized. When such an interrupting signal is recognized, an encoded interrupting word is transferred to the computer arithmetic unit. Such monitoring and interrupting conditions are handled solely by the executive control unit 38 and only passively involve the data transferring circuits. Further, the executive control unit 38 only sets up input and output channel control units 40 and 42. Once this is accomplished, the control units 40 and 42 independently and asynchronously control transfers directly with the computer memory.

Therefore, in accordance with the objects of this invention, it is possible to couple diverse peripherals to a given computer or diverse computers without requiring extensive programming. As all control occurs within the interface 24, which appears as one peripheral to the computer, programming is simplified because the same basic instructions are utilized for controlling or monitoring any peripheral connected to the interface. With reference to data transfers, the interface 24 permits simultaneous input and output data transfers because the transfers to the computer memory are made asynchronously in a direct memory access mode by independently operable control units.

c. Detailed Circuit Description

1. Device Card

Figure 7B:
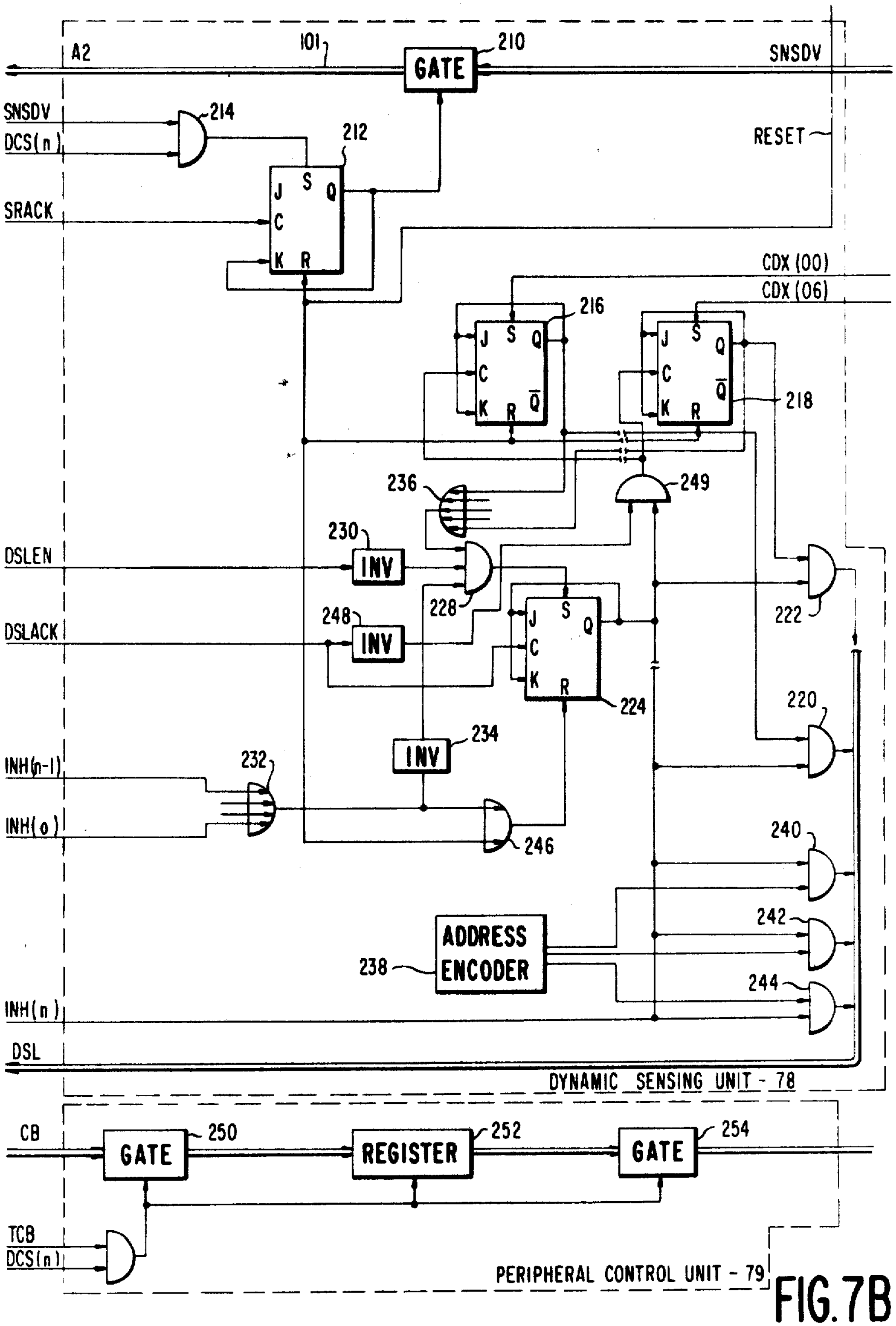

A typical device card is shown in more detail in FIGS. 7A and 7B. In these FIGURES and the remaining FIGURES, certain circuit elements are responsive to a RESET signal. This signal is generated by the computer for setting up the interface 24.

Referring to FIG. 7A, incoming data from the peripheral is coupled onto the bus 68 by way of a gate 150, a register 152 and another gate 154, all of which are located in the input data register 67. When a peripheral is ready to transmit data, it may generate either a TAKE DATA pulse or a DATA READY signal depending upon the peripheral construction. Either a TAKE DATA pulse or a DATA READY signal energizes an OR circuit 155 so either one is applied to an AND circuit 156. The AND circuit 156 energizes a pulse generator 158 when its other two inputs indicate that (1) a flip-flop 160 is reset, (2) no INRD instruction is being processed and (3) no computer reset signal is being generated. The second and third conditions are indicated by an OR circuit 159 connected to the AND circuit 156 through an inverter 161. Either a BUSY signal from the peripheral input address register 76 or a RESET pulse causes the OR circuit 159 to disable the AND circuit 156 and thereby prevent data transfers from the peripheral.

When the pulse generator 158 is energized, it enables the gate 150 to load the register 152 and transmits a DATA ACKNOWLEDGE signal to the peripheral. In addition, the pulse is applied to the flip-flop 160 through an OR circuit 162 to control the transfer from the register 152 through the gate 154.

For purposes of understanding the logic of the following discussion the flip-flop is represented as having direct set (S), direct reset (R), set (J), reset (K) and complement (C) inputs, two outputs, designated Q and $\overline{Q}$, are the set and reset outputs respectively. Any logical one or assertive signal to the S or R input directly sets or resets the flip-flop 160. If the J input is energized, the trailing edge of a pulse to the C input sets the flip-flop 160; if the K input is energized, the flip-flop is reset. If neither the J nor K input is energized, a pulse to the C input has no effect; if both are energized, the trailing pulse edge to the C input reverses or complements the output.

Assuming the flip-flop 160 has previously been reset, the output from the pulse generator 158 is coupled through an OR circuit 162 to the C input of the flip-flop 160. With only the J input energized, the flip-flop 160 is set as the pulse terminates and provides an input signal for each of two AND circuits 164 and 166. In addition, the flip-flop 160 disables the AND circuit 156 to prevent further data transfers to the register 152 until the data already loaded in the register 152 has been unloaded.

Two possible sets of conditions can exist when the flip-flop 160 is set, and they are identified by the status IDCS (*n*) signal. If the flip-flop 160 is set without a previous INOP instruction, the IDCS (*n*) signal is at a logical zero indicating interrupting conditions. If IDCS (*n*) is a logical one, then an INOP instruction has been generated. Assuming that interrupting conditions exist, the AND circuit 164 generates a CRFS (n) signal because the IDACK conductor, normally at a logical zero, is coupled to the AND circuit 164 through an inverter 168.

Once the interrupting conditions are recognized, the computer issues an INOP instruction and the input control unit 40 produces the IDCS (*n*) signal. The IDCS (*n*) signal permits the gate 154 to transfer the information onto the bus 68. As will now be evident, if the data transfer is initiated by an INOP instruction, the IDCS (*n*) signal exists first, so the gate 154 transfers the information onto the bus 68 upon termination of the pulse from the pulse generator 158.

After a present time delay sufficient to assure accurate presentation of the information, the input channel control unit 40 generates the IDACK pulse to transfer the information to the input register 69 (FIG. 3). The AND circuit 164 and analogous circuits in other device cards are disabled on the leading edge of the IDACK pulse to inhibit all CRFS signals. As both the IDACK pulse and IDCS (*n*) signal are coupled through an AND circuit 170 and the OR circuit 162, the flip-flop 160 is reset upon termination of the IDACK pulse. Hence, the AND circuit 156 is again enabled and new data can be loaded into the register 152.

Whenever data is to be transferred to a peripheral, an OUTOP instruction is issued with the decoded DCS (*n*) signal and OUTOP pulse being coupled to the output data register 72. Coincidence of the OUTOP pulse and DCS (*n*) signal is sensed by an AND circuit 172 which causes an OR circuit 173 to reset a flip-flop 174.

The ODCS (*n*) signal can be considered as a data ready signal to indicate that the transfer circuit 44 (FIG. 3) is ready to transmit data. Therefore, resetting the flip-flop 174 causes an AND circuit 176 to energize an OR circuit 178 and enable a gate 180 to transfer data on the bus 71 into the register 181. In addition, the output from the AND circuit 176 is coupled back to the output channel control unit 42 as the ODACK pulse. After a predetermined time delay which assures that the register 181 is properly loaded, the output channel control unit 42 causes the ODCS (*n*) signal to terminate. As a result, the gate 180 is disabled and the flip-flop 174 is set to generate a DATA READY signal to the peripheral. Setting the flip-flop 174 also enables an AND circuit 182 and disables the AND circuit 176. Hence, when the next ODCS (*n*) signal appears, the output data register 72 does not respond.

When the peripheral accepts all the data from the register 181, it generates a DATA ACKNOWLEDGE pulse which is coupled through the AND circuit 182 to energize both the K input of the flip-flop 174 and the OR circuit 176. The flip-flop 174 is therefore reset upon termination of the DATA ACKNOWLEDGE pulse so the AND circuit 176 is enabled to make the next transfer to the register 181.

When an internal peripheral address is generated after an INRD instruction, the address appears on the A2 bus 101. This address is coupled to the peripheral through the peripheral input address register 76. Specifically, a gate 183, counter 184 and gate 186 control the subsequent transfer to the peripheral. The INRD pulse and the DCS(n) and XC(03) signals exist simultaneously during such an INRD instruction and are all applied to an AND circuit 188 together with the $\overline{Q}$ output of a flip-flop 190. When the three enabling signals and INRD pulse exist simultaneously, the output signal from AND circuit 188 sets the flip-flop 190 by energizing the J input and, through an OR circuit 192, the C input simultaneously.

Setting the flip-flop 190 enables the gate 183 and generates the BUSY signal which is transmitted to the peripheral and to the OR circuit 159 in the input data register 67. When the A2PL pulse is subsequently generated to transfer the address, the output signal from an AND circuit 194, enabled when the flip-flop 190 is set, is coupled to the K input and, through an OR circuit 192 to the C input, to reset the flip-flop 190 on the trailing edge of the A2PL pulse. Resetting the flip-flop 190 disables the gate 183 after the address has been loaded into the counter 184. The address is transferred from the counter 184 through the gate 186 on the application of a GATE signal from the peripheral. If successive locations are to be identified, the peripheral generates an increment (INC) pulse to advance the counter 184 and thereby identify the next location.

An internal peripheral address for a data transfer to a peripheral is provided by a peripheral output address register 77 including a gate 196, a counter 198, which responds to other INC pulses from the peripheral, and a gate 200 which responds to other GATE pulses from the peripheral. An AND circuit 202, analogous to the AND circuit 188, responds to the $\overline{Q}$ output of a flip-flop 204, the OUTOP pulse and the XC(03) and DCS(n) signals to set the flip-flop 204 by energizing the J input and an OR circuit 206. The OR circuit 206 connects the AND circuit 202 to the C input of the flip-flop 204. Another AND circuit 208 is connected directly to the K input and to the C input through the OR gate 206. When the flip-flop 204 is set, a BUSY signal is generated and can be used by the peripheral. The AND circuit 208 is enabled by the BUSY signal so the flip-flop 204 is reset on the trailing edge of the next A2PL pulse to disable the gate 196 and complete the address transfer.

The dynamic sensing unit 78 in FIG. 7B responds to an SNSDV instruction and also generates interrupting signals. The signals representing the predetermined conditions for each peripheral appear on an SNSDV bus and are loaded onto the A2 bus 101 in response to an SNSDV instruction by a gate 210 controlled by a flip-flop 212. When an SNSDV pulse and DCS($n$) signal exist simultaneously, and AND circuit 214 sets the flip-flop 212 and enables the gate 210. The Q output is connected to the K input so a following SRACK pulse applied to the C input resets the flip-flop 212 and disables the gate 210 after the signals have been transferred to the computer arithmetic unit.

Signals representing various aspects of peripheral operation appear on Condition (CDX) lines CDX(00) through CDX(06) lines from the peripheral from time to time. Each signal sets a flip-flop. For example, a signal on the CDX(00) line directly sets a condition flip-flop 218. When a condition flip-flop is set, it energizes an AND circuit, such as AND circuits 220 and 222 associated with the flip-flops 216 and 218. There is one condition flip-flop and one AND circuit are associated with each DSL line.

When a control flip-flop 224 is set, it enables all the AND circuits and transfers the signals stored in the condition flip-flops onto the DSL bus. Two conditions must be met, however, before the flip-flop 224 can be set.

First, the computer must not be transferring information already on the XC bus 54. That is, the interface 24 must not be transferring information as part of a previous DSL interruption or in response to an SR instruction with the XC(00) bit set. When either condition exists, the enabling unit 114 (FIG. 4) starts to generate the DSLEN signal with the GDXCH pulse. At all other times, the DSLEN signal is not asserted; so an inverter 230 energizes an AND circuit 228 to indicate that the first condition is satisfied.

Secondly, no device card with a higher DSL interruption priority must be generating DSL signals onto the DSL bus. Each dynamic sensing unit 78 includes an OR circuit 232. All INHibit (INH) signals from device cards of a higher priority energize an inverter 234. Therefore, the inverter 234 energizes the AND circuit 228 when no higher priority device card generates an INH signal.

When these two conditions are satisfied, an OR circuit 236 enables the AND circuit 228 to directly set the control flip-flop 224. The OR circuit 236 is energized whenever at least one condition flip-flop is set. Setting the flip-flop 224 enables the AND circuits, such as AND circuits 220 and 222, connected to the condition flip-flops. The signal from the Q output of the control flip-flop 224 also serves the $INH_n$ signal for that device card and is coupled to OR circuits analogous to the OR circuit 232 in all device cards with a lower DSL priority.

As any device card can initiate a DSL interruption, each dynamic sensing unit 78 includes an address encoder 238 which enables the AND circuits 240, 242 and 244. The Q output signal from the control flip-flop 224 energizes these three AND circuits. Therefore, a three-bit identification code is transferred onto the DSL bus with the seven information bits to form the ten bits which are combined with two bits from the interrupting signal encoder 112 which identify the word as a DSL interrupting word. All device cards with a higher DSL priority generate INH signals which energize the OR circuit 232. Whenever an INH signal energizes the OR circuit 232 or the computer generates a RESET signal, another OR circuit 246 directly resets the control flip-flop 224. Resetting the control flip-flop 224 in this manner does not affect the states of the condition flip-flops, however. Therefore, the flip-flop 224 is set immediately after higher priority DSL interrupts are serviced.

Once a DSL interruption has been acknowledged, the dynamic sensing unit 78 must be reset. When the computer retrieves the DSL interruption word, the enabling unit 114 (FIG. 4) generates the DSLACK pulse. The Q output of each condition and control flip-flop energizes its own J and K inputs so a signal change appearing as the trailing edge of a pulse at the "C" input resets any set flip-flop.

As the DSLACK pulse is coupled through an inverter 248 to an AND circuit 249 and the control flip-flop 224 energizes the AND circuit 249, it produces an assertive signal until the leading edge of the DSLACK pulse disables the AND circuit 249. At this time, the AND circuit 249, which is coupled to the C inputs, resets any set condition flip-flop. The AND circuit 249 assures that the condition flip-flops are reset only after the information stored in these flip-flops is transferred onto the DSL bus and the XC bus. The control flip-flop 224 is set until the trailing edge of the DSLACK pulse because the DSLACK pulse energizes the C input directly.

The final element in the device card shown in FIG. 7 is the peripheral control unit 79 which couples the CB bits, bits XC(03) through XC(09) of a TCB instruction, to the peripheral. This circuit comprises a gate 250, a register 252 and a gate 254. Both gates 250 and 254 are energized by an AND circuit 256 when the TCB pulse and DCS ($n$) signal from the executive control unit 38 exist simultaneously. The control signals are then coupled directly to the peripheral through the two gates 250 and 254 and the register 252 when both gates are enabled.

Although FIGS. 3, 7A and 7B show a device card including input and output data registers 67 and 72, peripheral input and output address registers 76 and 77, a dynamic sensing unit 78 and a peripheral control unit 79, all these registers and units are not necessary for all peripherals. For example, a tape reader requires only an input data register 67, a dynamic sensing unit 78 and a peripheral control unit 79 while a teletypewriter may require all registers and units.

2. Executive Control Unit, Function Decoder and Card Select Device

Certain details of the executive control unit 38 are shown in FIG. 8. The XC bus 54 may have any number of conductors to serve various functions. In the specific embodiment shown in FIG. 8 only the wires XC(00) through XC(11) in the exemplary eighteen-wire bus are utilized for instructions.

When the computer issues an instruction for the interface, a gate 260 loads the instruction into a multistage register 262 when the distributor 92 (FIG. 3) generates the LIR pulse. The multistage register 262 then stores the XC(00) through XC(11) bits until a subsequent LIR pulse loads the next instruction.

The function decoder 88 responds to the XC(09), XC(10) and XC(11) bits of an instruction word and typically includes an output gate 264 controlled by the delayed TIR pulse. A decoded function signal generated in a plurality of AND circuits is transferred through the gate 264 as a pulse after the signals from the register 262 have stabilized. Specifically, an AND circ uit 266 is energized directly by signals on the XC(09) through XC(11) wires. Therefore the SR pulse is issued by the gate 264 when the XC(09) through XC(11) bits are all set and the TIR pulse is generated. Signals on the XC(11) and XC(10) wires also energize inverters 268 and 270. An AND circuit 272 is energized by a signal on the XC(09) wire and signals from both inverters 268 and 270. When the AND circuit 272 is energized in response to an INOP instruction, the gate 264 issues the INOP pulse. Each output pulse from the gate 264 is coextensive with the TIR pulse and is generated as shown in TABLE 8.

TABLE 8

| | XC | | OUTPUT FROM FUNCTION |
|---|---|---|---|
| 11 | 10 | 09 | DECODER 88 |
| 0 | 0 | 0 | none |

| | | | |
|---|---|---|---|
| 0 | 0 | 1 | INOP |
| 0 | 1 | 0 | OUTOP |
| 0 | 1 | 1 | INRD |
| 1 | 0 | 0 | TCB |
| 1 | 0 | 1 | TIEP |
| 1 | 1 | 0 | SNSDV |
| 1 | 1 | 1 | SR |

Signals on the XC(00), XC(01) and XC(02) wires are coupled from the instruction register 86 to the card select decoder 90 to identify a specific device card. The card select decoder 90 includes inverters 274, 276 and 278 and a plurality of decoding AND circuits. Each AND circuit generates an appropriate DCS signal depending on how it is connected to the wires and the inverters. For example, a DCS(7) signal is generated by an AND circuit 280 when it is directly energized by signals on the XC(00), XC(01) and XC(02) wires. An AND circuit 282, energized by the signals from the inverters 274, 276, and 278, generates a DCS(0) signal when all three wires are at zero. Each DCS signal is generated for signals on the XC(00), XC(01) and XC(02) wires as shown in TABLE 9.

TABLE 9

| XC | | | OUTPUT FROM |
|---|---|---|---|
| (02) | (01) | (00) | CARD DECODER 90 |
| 0 | 0 | 0 | DCS(0) |
| 0 | 0 | 1 | DCS(1) |
| 0 | 1 | 0 | DCS(2) |
| 0 | 1 | 1 | DCS(3) |
| 1 | 0 | 0 | DCS(4) |
| 1 | 0 | 1 | DCS(5) |
| 1 | 1 | 0 | DCS(6) |
| 1 | 1 | 1 | DCS(7) |

As the card select decoder 90 is energized directly from the register 262, the DCS(*n*) signal appears before the function code pulse and exists so long as the register 262 is loaded.

3. Executive Control Unit — Timing Unit, Timing Decoder and Distributor

Figure 9:
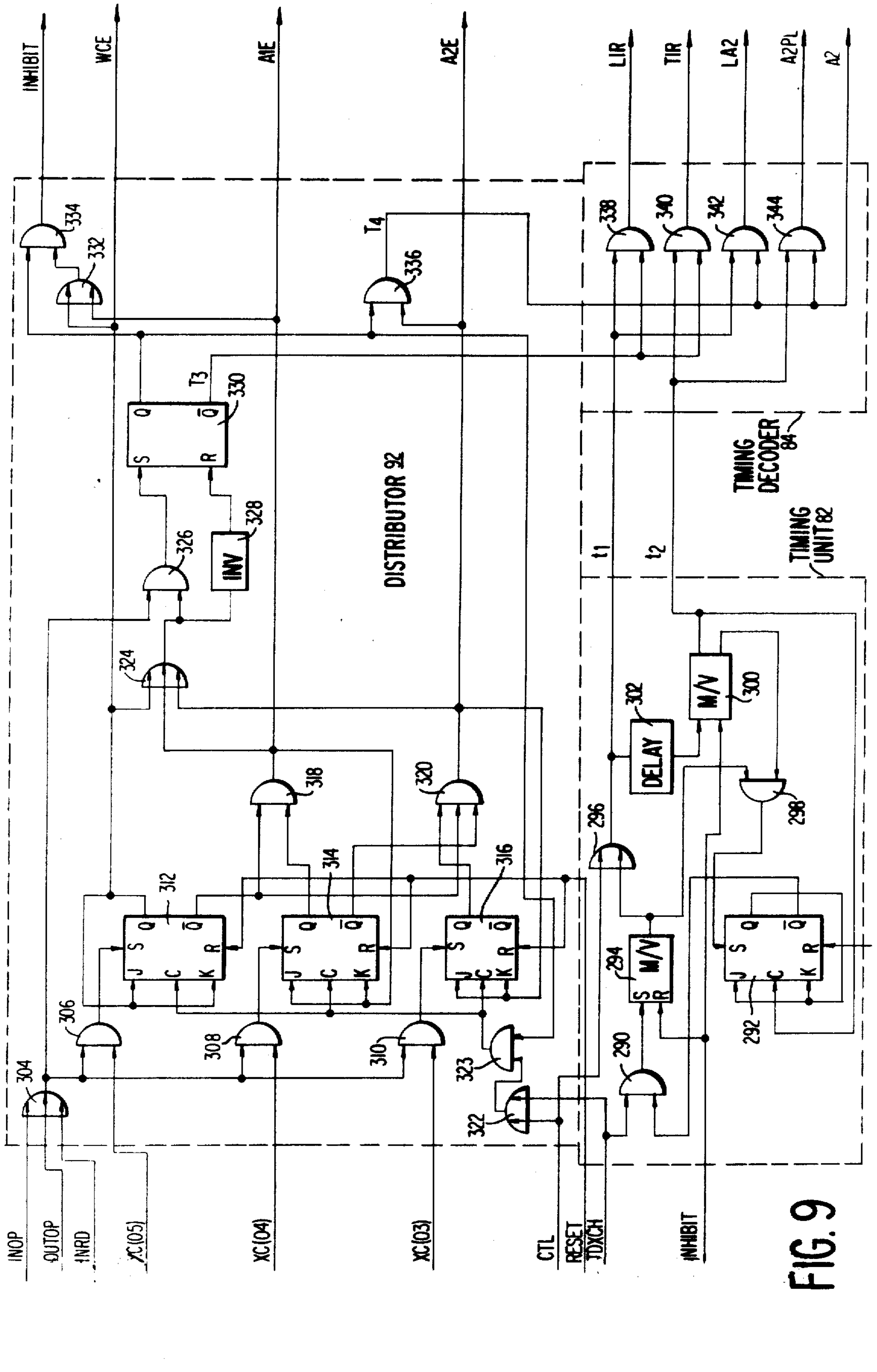
FIG. 9 is a detailed diagram of timing unit, timing decoder and distributor shown in FIG. 4.

Further details related to timing in the executive control unit 38 are shown in FIG. 9. The timing unit 82 normally responds to the TDXCH pulse from the decoder 60 (FIG. 2) which energizes an AND circuit 290 when an inhibiting flip-flop 292 is reset. The flip-flop 292 is set only when a previous TDXCH pulse is being processed. When the AND circuit 290 is energized a monostable multivibrator 294 causes an OR circuit 296 to produce the t1 pulse and energize the timing decoder 84.

Some computers present the instruction to the interface 24 for a time period which is significantly shorter than the t1 pulse duration. To avoid improper storage of such instructions, a computer pulse, identified as the CTL pulse, energizes the OR circuit 296 to produce the *t1* pulse which is significantly shorter than the pulse from the multivibrator. As is evident, the multivibrator 294 is not energized if the CTL pulse is used.

When the timing unit 82 does respond to a TDXCH pulse the multivibrator 294 energizes an AND circuit 298 enabled by the inverted output from another monostable multivibrator 300. Energizing the AND circuit 298 sets the flip-flop 292, inhibiting the multivibrator 294 and energizing both the J and K inputs of the flip-flop 292.

The timing pulse *t1* is applied through a delay circuit 302 to energize the multivibrator 300 and produce the *t2* timing pulse. During the *t2* pulse, the multivibrator 300 deenergizes the AND circuit 298 so the trailing edge of the t2 pulse resets the flip-flop 292 and enables the AND circuit 290. The t2 pulse is also applied directly to the timing decoder 84. Interposing the delay circuit 302 assures that final conditions exist at the outputs of the various decoders and registers and thereby avoids interface response to transient conditions or signals.

Certain signals from the instruction register 86 and the function decoder 88 are coupled to the distributor 92. The INOP, OUTOP and INRD pulses from the gate 264 shown in FIG. 8 are transferred to an OR circuit 304 shown in FIG. 9. The existence of any of these pulses energizes any of AND circuits 306, 308 and 310 which are enabled by signals on the XC(05), XC(04) and XC(03) wires respectively. Signals on these wires indicate that a word count, a computer address or a peripheral address immediately follow the instruction on the XC bus 54. Energizing the AND circuits 306, 308 and 310 set flip-flops 312, 314 and 316 respectively.

When the flip-flop 312 is set, the word count enable (WCE) signal is generated; when the flip-flop 312 is reset, it applies enabling signals to AND circuits 318 and 320. The output of the AND circuit 318 is a computer address enable signal (A1E) while the output of the AND circuit 320 is the peripheral address enable signal (A2E). Therefore, even though the flip-flops 314 and 316 are set, the A1E and A2E signals are inhibited when the flip-flop 312 is set. It will now be evident that the XC(05) and XC(04) bits of an INRD instruction and the XC(03) bit of an INOP instruction must be set to zero to avoid improper operation of the distributor since, by definition, these bits have no significance in those instructions.

When the flip-flop 312 is set, a pulse to its C input resets it. However, the same pulse to the C inputs of the flip-flops 314 and 316 has no effect until the AND circuits 318 and 320 respectively are energized. The resetting pulse is produced by either the next TDXCH pulse or CTL pulse is applied to an OR circuit 322 when an AND circuit 323 is enabled by a signal from a multiword latch described later. Such a pulse resets the flip-flop 312, but not the flip-flops 314 and 316. Resetting the flip-flop 312 disables the WCE signal, but the AND circuit 318 is energized and produces the A1E signal.

Now the flip-flop 314 can be reset by the next TDXCH or CTL pulse which loads the initial computer address. When the flip-flop 314 is reset, the third signal to the AND circuit 320 causes the A2E signal to be generated. On the next TDXCH or CTL pulse which loads the peripheral address, the flip-flop 316 is reset and the A2E signal is deenergized. Therefore, the distributor 92 responds to the INOP, OUTOP or INRD pulses and the microcoded XC(03), XC(04) and XC(05) bits to produce the WCE, A1E and A2E signals in sequence. If any of the three XC bits is absent, the distributor 92 skips the related output signal. For example, if XC(04) bit were not set in an OUTOP instruction, the A2E signal would immediately follow the WCE signal.

The distributor 92 also provides control signals to the timing circuit 82 and the timing decoder 84. An OR circuit 324 is energized by the WCE, A1E or A2E signals, and its output is coupled through an AND circuit 326 and an inverter 328 to the setting and resetting inputs of the multiword latch identified by reference numeral 330. When the latch 330 is set during a multiword instruction sequence, the AND circuit 323 is enabled. The timing unit 82 is disabled during portions of the multiword instruction by circuitry including an OR circuit 332, an AND circuit 334 and the latch 330. Both the WCE and A1E signals from the flip-flop 312 and the AND circuit 318 are coupled through the OR circuit 332 to energize the AND circuit 334 when the latch 330 is set. The resulting INHIBIT signal during word count and initial computer address transfers disables both the multivibrators 294 and 300 in the timing circuit 82. During the transfer of a peripheral address, the timing circuit 82 is not inhibited because the OR circuit 332 is not energized by the AND circuit 320. A T3 signal is generated by the latch when it is reset and is coupled to the timing decoder 84. The latch 330 is reset when none of the WCE, A1E and A2E signals exist because the OR circuit 324 is coupled through the inverter 328 to the reset input of the latch 330.

An AND circuit 336 generates a T4 signal when the multiword latch 330 is set and the AND circuit 320 is energized.

The timing decoder 84 responds to the t1 and t2 pulses from the timing unit 82 and the T3 and T4 signals from the distributor 92. It includes AND circuits 338, 340, 342 and 344 which produce the LIR, TIR, LA2 and A2PL output pulses. In addition, the T4 signal is coupled directly through the timing decoder 84 to generate an TA2 timing signal. The *t*1 pulse is coupled to the AND circuits 338 and 342; the *t*2 pulse, to the AND circuits 340 and 344. As the T3 signal is applied to the AND circuits 338 and 340, the LIR and TIR pulses are inhibited during the word count, computer address and internal peripheral address transfers. However, the LA2 and A2PL pulses and the TA2 signal are generated to transfer the internal peripheral address because the T4 signal is applied to the AND circuits 342 and 344.

The functions and structure of the timing decoder 84 is most clearly defined in TABLE 10 where a ( ·) identifies a "logical and" operation.

TABLE 10

| OUTPUT | AND CIRCUIT | OPERATION |
|---|---|---|
| LIR | 338 | *t*1·T3 |
| TIR | 340 | *t*2·T3 |
| LA2 | 342 | *t*1·T4 |
| A2PL | 344 | *t*2·T4 |
| TA2 | — | T4 |

As previous described, the LIR pulse enables the instruction register 86 while the TIR pulse controls the function decoder 88. The LA2 and A2PL pulses and the TA2 signal control loading of the A2 register 94 (FIG. 4) and the peripheral input address register 76 or peripheral output address register 77.

4. Input Control Unit — Word Counter and EOF Generator

If the XC(05) bit of an INOP instruction is set, the next information transfer to the interface 24 is a word count which is loaded into the word counter 122 (FIG. 5). Referring to FIG. 10, such a transfer is made when the controller 118 issues a LOAD WC signal to gates 350 and 352 so each bit in the word count sets or resets an associated flip-flop. Gate 350 couples the signal on each XC wire directly to an S input of one stage of a counter while the gate 352, coupled to the XC bus through an inverter 354, places the inverted signal on the R input. For purposes of explanation, three stages of the word counter, flip-flops 356, 358 and 360, are shown which are set when the signals on the XC(00), XC(01) and XC(11) wires respectively are logical "ones" and reset when the signals are logical "zeroes."

The various flip-flops are interconnected to form a synchronous counter having plural stages. For example, the flip-flop 356 has its J and K inputs maintained at a logical one so that each pulse to the C input causes the output to reverse. The flip-flop 356 energizes the J and K inputs of the next flip-flop 358 while the Q output of the flip-flop 358 is coupled to an AND circuit 362. The AND circuit 362 is also energized by the flip-flop 356 so that a signal is generated when both flip-flops 356 and 358 are set. This signal is applied to the next AND circuit analogous to an AND circuit 364 in the next stage. The AND circuit 364 is also energized by the Q output of the flip-flop 360 and conditions the J and K inputs of the flip-flop 360.

The counter is sequenced when each stage simultaneously is energized by a pulse from an AND circuit 366. This pulse is produced when a GDIC pulse and TURN ARD and ICHR signals exist simultaneously. As previously described, the GDIC pulse comes from the buffer unit 46 (FIG. 3) while the ICHR signal comes from the input channel control unit 40. The TURN ARD signal, provided by the byte control unit as described with reference to FIG. 11, indicates that all data in the transfer circuit input channel register 69 (FIG. 2) has been completely loaded into the computer.

The flip-flops may be used as a two's-complement counter. The word count, which identifies the number of interface words to be transferred, is loaded in two's-complement form and then incremented by successive outputs from the AND circuit 366 as each interface word is transferred into the computer.

Figure 12:
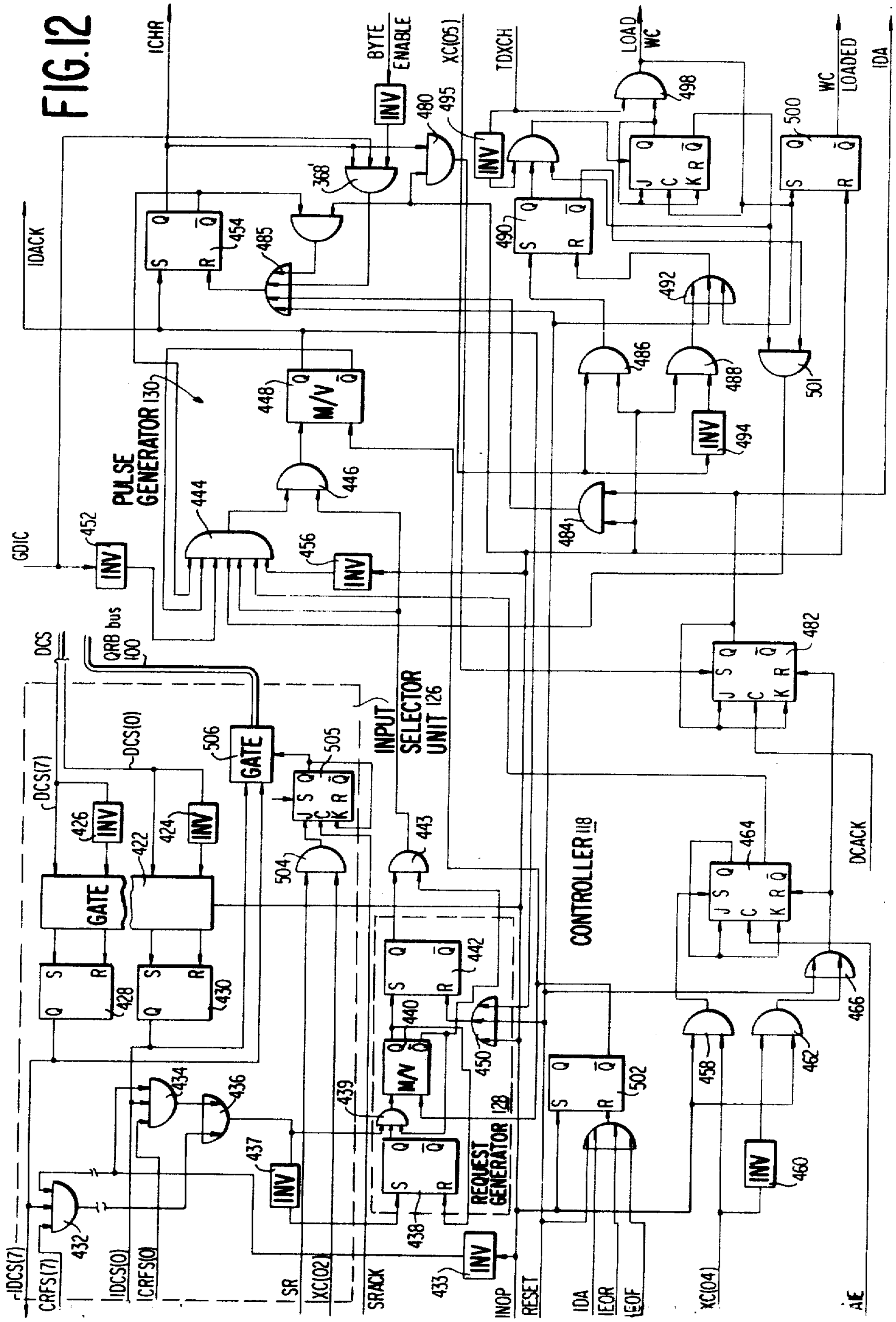
FIG. 12 depicts, in schematic form, a controller for the input channel control unit of FIG. 5 together with an input selector unit, a request generator and pulse generator.
Figure 14:
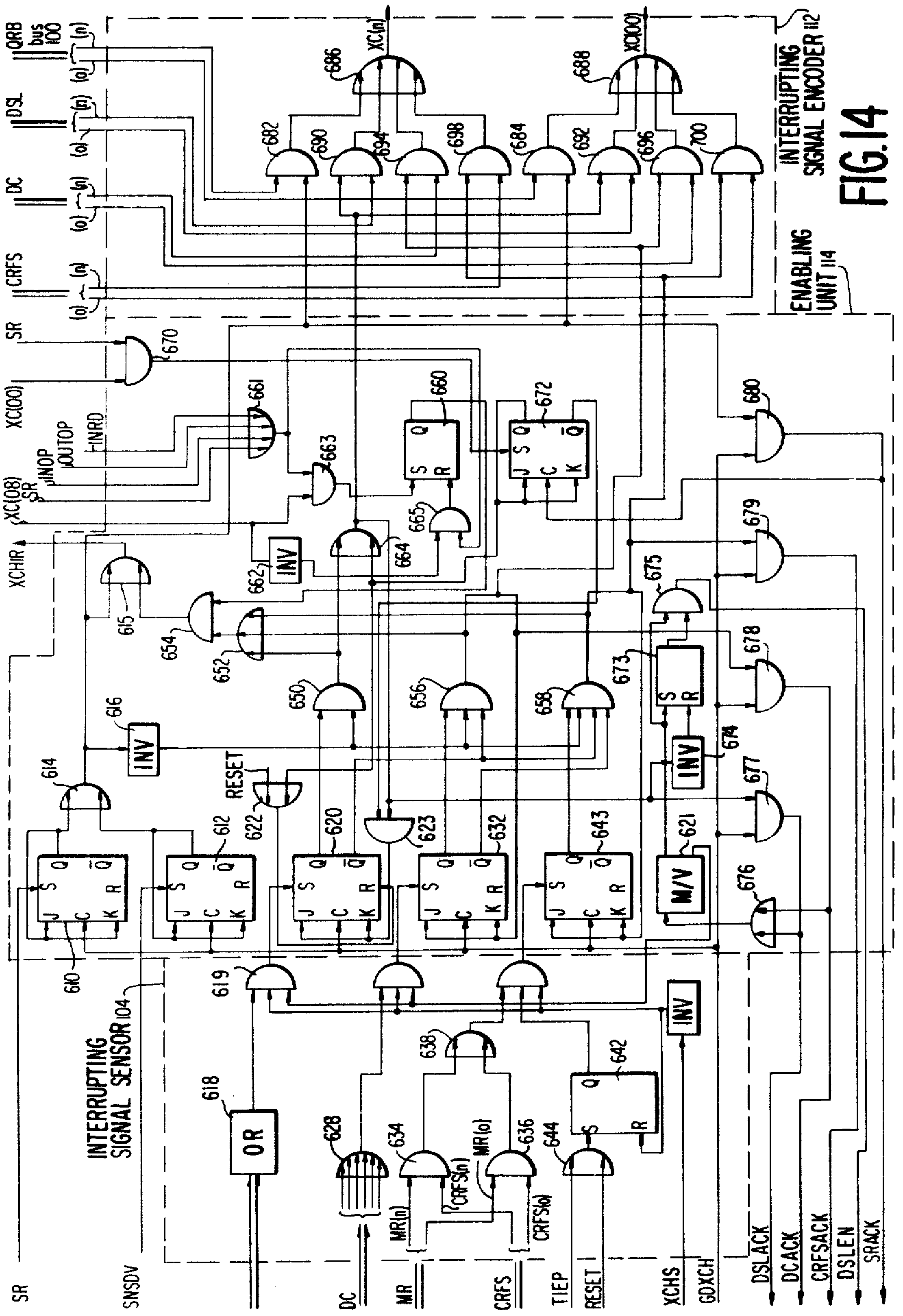
FIG. 14 is a logical representation of an interrupting signal sensor, enabling unit and interrupting signal encoder adapter for use in the executive control unit of FIG. 4.

When the flip-flop 360 is set and the AND circuit 364 is energized, the next interface word to be transferred will return the counter to a zero state to indicate that all data words in the block are transferred. An AND circuit 368 is energized by the flip-flop 360, the AND circuit 364, the AND circuit 366 and a WC LOADED signal from the controller 118 (FIGS. 5 and 12). Coincidence of the three signals and pulse applied to the AND circuit 368 set a flip-flop 370 during the last transfer so the AND circuit 372, energized simultaneously by the GDIC pulse, produces the IEOF signal which is applied to the interrupt sensor 104 (FIGS. 4 and 14). Once the interruption is recognized, the enabling unit 114 produces the DCACK pulse which resets the flip-flop 370.

As previously indicated, an SR instruction with the XC(06) bit set transfers the count at the time of the SR instruction onto the QRB bus 100. In response to the instruction an AND circuit 374 sets a flip-flop 376. Setting the flip-flop 376 enables a gate 378 to transfer the count stored in the counter flip-flops onto the QRB bus 100. The flip-flop 376 is reset when the enabling unit 114 (FIGS. 4 and 14) generates the SRACK pulse which is applied to the C input of the flip-flop 376.

5. Input Control Unit — Input Byte Control Unit

Figure 11:
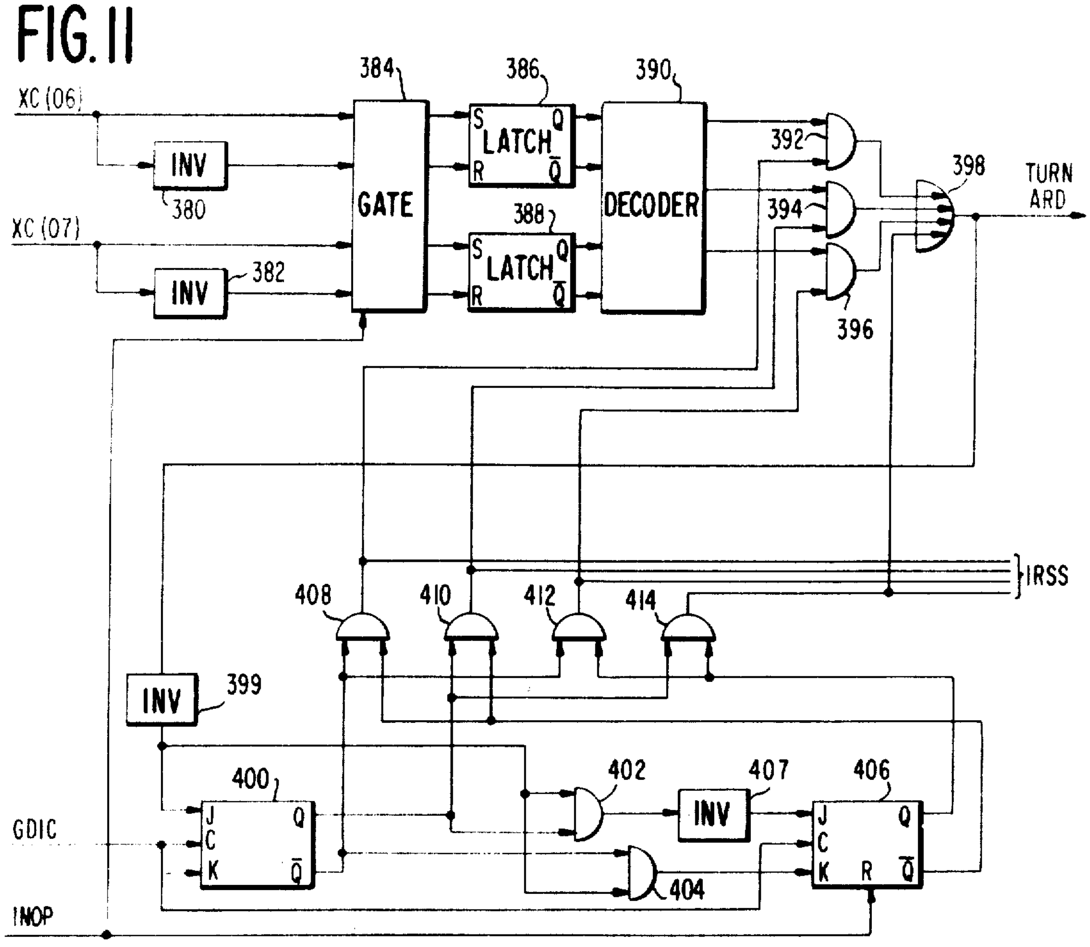
FIG. 11 presents details of one embodiment of an input byte control unit for use in the input channel control unit of FIG. 5.

The XC(06) and XC(07) bits in an INOP instruction are set in accordance with the number of data transfers required to unload the input channel register 69. Both signals, and their inverted counterparts produced by inverters 380 and 382 shown in FIG. 11, are coupled through a gate 384 enabled by the INOP pulse. The XC(06) and XC(07) signals are coupled directly to the set inputs of latches 386 and 388 respectively; the inverted signals, to the respective reset inputs. Both outputs from each latch are applied to a decoder 390 to energize one of three wires for certain combinations of signals on the XC(06) and XC(07) wires. The energized wire from the decoder 390 represents a maximum count to be achieved during transfers to the computer.

The signals from the decoder 390 indicate that data stored in the input channel register 69 is to be transferred to the computer in one, two, three or four transfer operations. During each transfer operation a predetermined number of bits equal to the number of bits in a computer word are loaded into the computer memory. For example, in the previously described sixteen-bit computer, the XC(06) and XC(07) bits could be microcoded to make either one or two sixteen-bit transfers. If the computer stores eight-bit words, up to four eight-bit transfers could be made. The resulting signal from the decoder 390 sets an upper limit for a counter by enabling one of the AND circuits 392, 394 and 396 when a multiple transfer operation is required. Each AND circuit energizes an OR circuit 398, the output of which, the TURN ARD signal, is generated when an upper limit is reached.

The TURN ARD signal is coupled through an inverter 399 to the J input of a flip-flop 400 and to AND circuits 402 and 404. The other inputs to the AND circuits 402 and 404 are the Q and $\bar{Q}$ outputs of the flip-flop 400 respectively. Another flip-flop 406 has its J input energized by an inverter 407 connected to the AND circuit 402; its K input is directly energized by the AND circuit 404.

In addition, the $\bar{Q}$ output of the flip-flop 406 energizes AND circuits 408 and 410 while the Q output energizes AND circuits 412 and 414. The Q output of the flip-flop 400 is applied to AND circuits 410 and 414 while the $\bar{Q}$ output is applied to AND circuits 408 and 412. The outputs of these four AND circuits constitute the IRSS signals which are coupled to the transfer unit 44 (FIG. 3) to control selection of the byte to be transferred to the computer as a computer data word.

During an INOP instruction, the INOP pulse resets both flip-flops 400 and 406 thereby energizing the AND circuit 408 which enables the AND circuit 392. If the decoder 390 also energizes the AND circuit 392 indicating a single transfer operation, the TURN ARD signal is generated immediately. In this situation, the TURN ARD signal does not permit the counter formed by the flip-flops 400 and 406 to increment. Therefore, only single transfer operations are permitted. If, on the other hand, a multiple transfer is defined by the XC(06) and XC(07) bits, the OR circuit 398 will be energized by the outputs of one of the AND circuits 394 or 396 or directly by the output of the AND circuit 414. In this situation, no TURN ARD signal blocks the counter, so the next GDIC pulse advances the counter and the AND circuit 410 is energized. If the AND circuit 394 were enabled by the decoder 390, the TURN ARD signal would be generated and the next GDIC pulse would reset the flip-flops 400 and 406. If the XC(06) and XC(07) bits define a four transfer operation, then the TURN ARD signal is not generated until the counter energizes the AND circuit 414. Therefore, the decoder 390 sets a limit on the number of transfers while each transfer is counted by the flip-flops 400 and 406 until the limit is reached whereupon the TURN ARD signal is generated. The TURN ARD signal indicates when the input channel register 69 is completely unloaded.

6. Input Control Unit — Selector Unit, Request Generator, Pulse Generator and Controller An INOP instruction with the XC(04) and XC(05) bits set indicates that a word count and an initial computer address will be the next transmissions to the interface. The controller 118, the input selector unit 126, the request generator 128 and the pulse generator 130 perform several functions in response to such an instruction and are specifically shown in FIG. 12.

When an INOP instruction is received by the executive control unit, the resulting DCS signals are coupled to a gate 422 both directly and through inverters. By way of example, an inverter 424 couples the DCS(0) signal; an inverter 426, a DCS(7) signal. One DCS signal selects a particular device card, and the delayed INOP pulse gates the information to energize latches such as a latch 428 and a latch 430. Only one latch, the latch 428 for DCS(7), for example, is set and generates an IDCS signal. The remaining latches including the latch 430 are forced to a reset condition.

Assume a CRFS(7) signal from the selected device card (FIG. 7) is generated to indicate that data is available. A data transfer is then initiated when an AND circuit 432 is energized. This occurs when the IDCS(7) and CRFS(7) signals exist simultaneously after the INOP pulse terminates. The INOP pulse is coupled to the AND circuits 432 and 434 through an inverter 433. A second AND circuit 434 is disabled because the IDCS(0) signal does not exist. An OR circuit 436 is energized by AND circuits, such as AND circuits 432 and 434 whenever one AND circuit is energized.

During an INOP pulse, the OR circuit 436 is disabled. The output from the OR circuit 436 is coupled through an inverter 437 to set a latch 438 during the INOP pulse. In addition, an AND circuit 439 is disabled so a monostable multivibrator 440 can not be triggered. After the INOP pulse terminates, the occurrence of the CRFS(7) signal energizes the AND circuit 432 and the OR circuit 436 to enable the AND circuit 439 and trigger the multivibrator 440. The resulting pulse sets another latch 442 and resets the latch 438. In addition, the multivibrator 440 disables the AND circuits 439 and 443 until the multivibrator 440 returns to the stable state. Therefore, the output from the AND circuit 443, which is a transfer request signal applied to an inhibiting AND circuit 444 and another AND circuit 446, is delayed after the coincidence of the CRFS(7) and IDCS(7) signals to permit any transients in the data signals to dissipate.

If no inhibiting conditions exist, the AND circuit 446 triggers another monostable multivibrator 448 to produce the IDACK pulse which is transferred to all input data registers (FIG. 7). Only the device card selected by the IDCS signal uses the IDACK pulse as an acknowledgement of a transfer although all CRFS signals are inhibited during the IDACK pulse. The IDACK pulse also energizes an OR circuit 450 to reset the latch 442. Hence, the pulse generator 130 is immediately enabled to receive the next request from the request generator 128. The latch 442 may also be reset by computer RESET signals or INOP pulses.

If any other input to the AND circuit 444 is at a logical zero, the request from the generator 128 is inhibited and not serviced. One input to the AND circuit 444 is the negative output from the multivibrator 448 so the and circuit 444 is not energized if an IDACK pulse is being generated. A GDIC pulse disables the AND circuit 444 by being coupled through an inverter 452. When a latch 454 is set by the IDACK pulse, the resulting ICHR signal indicates that the input channel is ready to transmit data. Additional transfers from the device card are blocked by coupling the $\bar{Q}$ output of the latch 454 to the AND circuit 444. An inverter 456, energized by the INOP pulses, disables the AND circuit 444 so long as the function decoder 88 (FIG. 8) generates the INOP pulse.

The AND circuit 444 is also inhibited during computer address transfers. When the XC(04) bit in an INOP instruction is set, an AND circuit 458 is energized. The signal on the XC(04) wire is also passed through an inverter 460 to an AND circuit 462. Coincidence of the INOP pulse and XC(04) signal causes the AND circuit 458 to set a flip-flop 464 as the AND circuit 462 is not energized and does not produce any signal at the output of an OR circuit 466. The $\bar{Q}$ output of the flip-flop 464 is connected to the AND circuit 444 and thereby disables the AND circuit 444 until the A1E signal disappears. When the flip-flop 464 is set, both the J and K inputs are energized. Upon termination of the A1E signal, which is also applied to the C input, the flip-flop 464 is reset and ceases to generate an inhibiting signal. The flip-flop 404 is also directly reset by computer RESET signal applied directly to an OR circuit 466 which is also energized by the AND circuit 462 to force the flip-flop 464 to reset. Another inhibiting signal, generated while the word counter is being loaded, is described later. If any one of these inhibiting conditions exists, one input to the AND circuit 444 is a logical zero; and the multi-vibrator 448 is disabled.

Another condition sensed by the controller 118 is the issue of a second INOP instruction before all data requested by a preceding INOP instruction has been transferred. As the first INOP pulse sets the latch 454, the second INOP pulse energizes an AND circuit 480 and sets a flip-flop 482. When set, the flip-flop 482 produces the IDA signal which indicates that data being transferred in response to the first INOP INSTRUCTION has been lost. As the IDA signal and INOP pulse are coupled through an AND circuit 484, an OR circuit 485 resets the latch 454 and eliminates the ICHR signal. A subsequent DCACK pulse applied to the C input resets the flip-flop 482.

When the XC(05) signal and INOP pulse exists simultaneously, a word count is to be loaded. The XC(05) signal and INOP pulse are applied to each of a pair of AND circuits 486 and 488 to set a latch 490. An OR circuit 412 resets the latch in response to a signal from the AND circuit 488, a computer RESET signal or a LOAD WC signal. An AND circuit 494 is energized when the latch 490 is set and when the TDXCH pulse does not exist, the TDXCH pulse being coupled to the AND circuit 494 through an inverter 495. The third input to the AND circuit 494 is a reset signal from a flip-flop 496. Energizing the AND circuit 494 sets the flip-flop 496 indicating that a word count is to be loaded. The next TDXCH pulse generates the LOAD WC pulse by energizing an AND circuit 498 which is enabled when the flip-flop 496 is set. The LOAD WC pulse is applied to the gates 350 and 352 (FIG. 10), it also resets the flip-flop 496 and sets a latch 500 to disable the WC LOADED signal until a following INOP signal resets the flip-flop 500. The WC LOADED signal enables the EOF generator 120 (FIG. 10).

When the flip-flop 496 and the latch 490 are both reset, an AND circuit 501 is energized to generate the enabling signal which is coupled to the AND circuit 444. If a word count is being loaded, the AND circuit 501 produces a logical zero output to disable the AND circuit 444. This is the word count inhibiting signal and the last inhibiting signal applied to the AND circuit 444.

A final control function is provided by a latch 502 and an OR circuit 503. An INOP pulse sets the latch 502 to remove the inhibiting signals from the multivibrators 440 and 448. Thereafter, an IEOF, IEOR, IDA or computer-issued RESET signal applied to the OR circuit 503 resets the latch 502 and disables the multi-vibrators 440 and 448.

When it is necessary to identify the selected device card to the computer, an SR instruction with the XC(02) bit set set issues. The resulting SR pulse and XC(02) signal enable an AND 504 circuit to set a flip-flop 505 and transfer the outputs of the various latches, such as latches 428 and 430, through a gate 506 onto the QRB bus 100. As the Q output of the flip-flop 505 energizes the K input, so the following SRACK pulse resets the flip-flop 505 and disables the gate 506.

Figures 10, 13B:
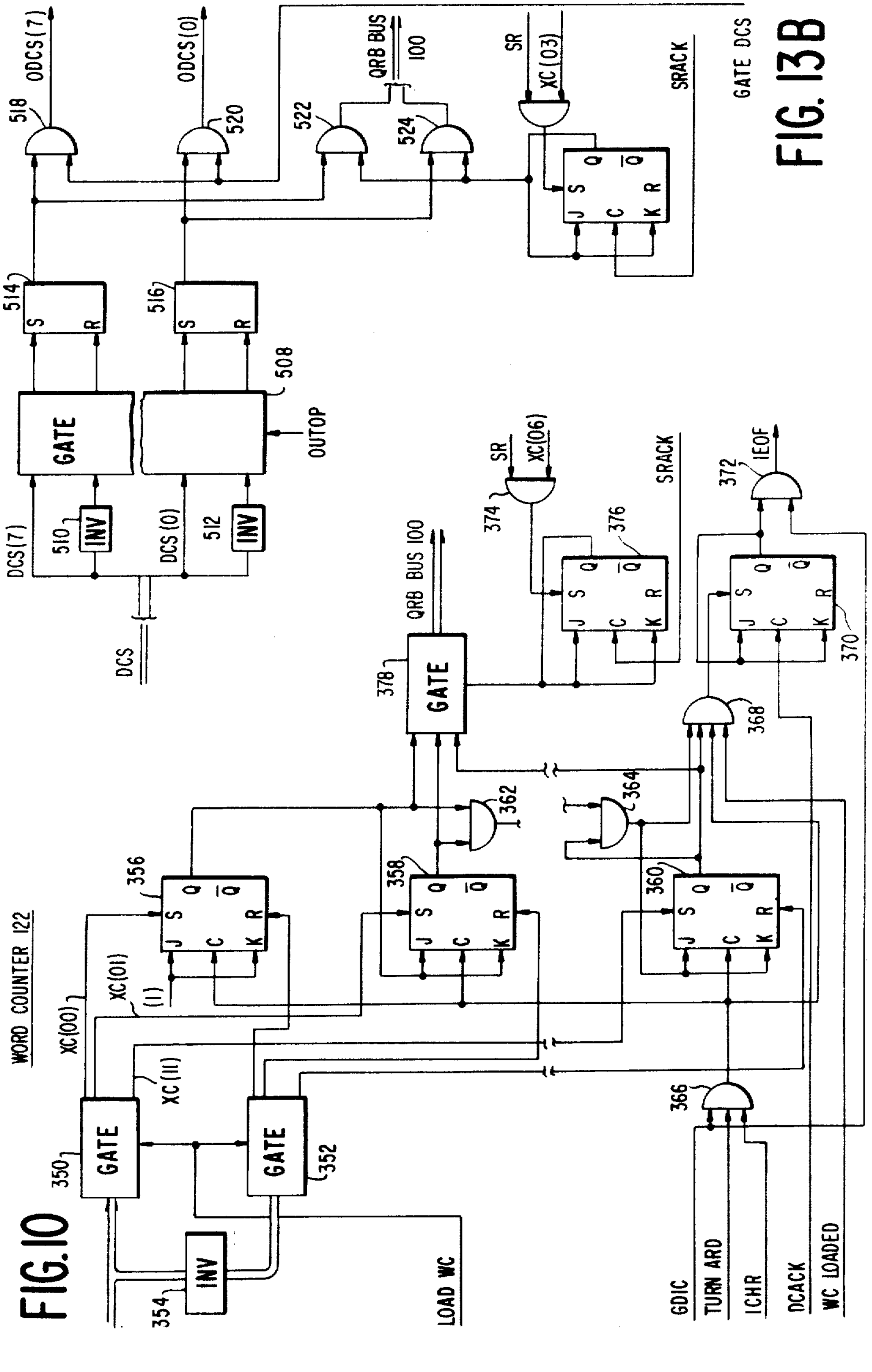
FIG. 10 schematically illustrates an input channel control word counter and end-of-field generator shown in FIG. 5.
FIGS. 13A and 13B depict a controller and output selector for the output channel control unit of FIG. 6.

Briefly summarizing, the detailed input channel control unit circuitry shown in FIGS. 10 through 12 and the detailed executive control unit circuitry shown in FIGS. 8 and 9 illustrate how the interface transfers data from the peripheral to the computer. Furthermore, it is evident that the executive control unit initially acts to set up the input channel control unit. Thereafter the input channel control unit has complete control over the data transfer. The executive control unit only becomes actively involved in such a transfer if some of the interrupting signals such as the IEOF, IEOR or IDA signals, are generated.

7. Output Control Unit — Output Selector and Controller

Figure 13A:
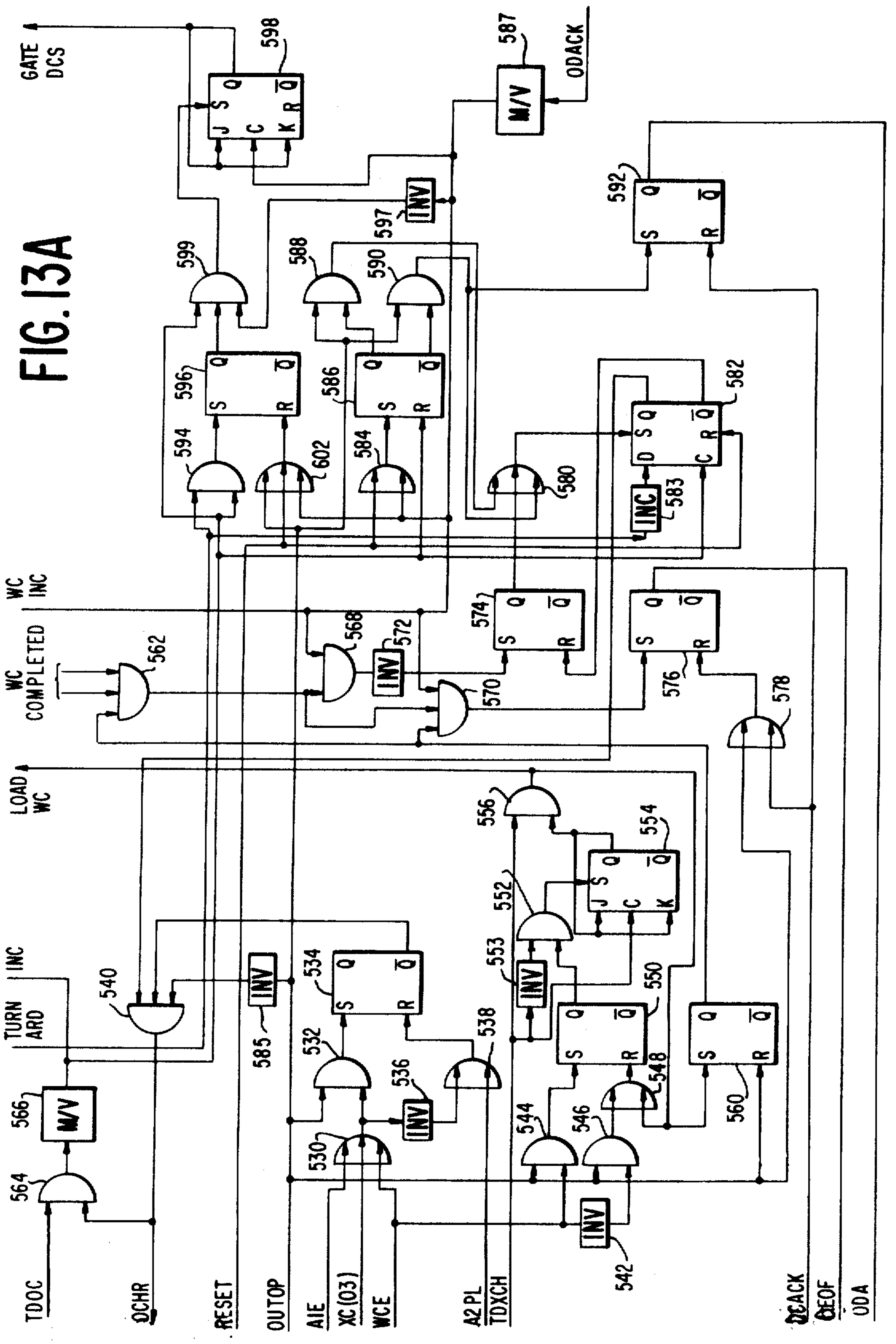

If an OUTOP instruction is issued by the computer with the XC(03), XC(04) and XC(05) bits set, the controller 132 and the output selector unit 140 shown in FIGS. 13A and 13B respond. The DCS signal from the card select decoder 90 (FIG. 4) is applied to a gate 508 (FIG. 13B). An inverter 510 energized by the DCS(7) signal and an inverter 512 energized by the DCS(0) signal also couple signals to the gate 508, these specific circuits being shown by way of example. The delayed OUTOP pulse loads the DCS signals and their inverted values into a plurality of latches. Specifically a DCS(7) signal sets a latch 514; a DCS(0) signal, latch 516. Only one latch is set; the rest are forced to a reset condition. If the DCS(7) signal sets the latch 514, an AND circuit 518 is the only AND circuit which can be energized by a GATE DCS pulse from the controller 132 to produce the ODCS(7) signal. An AND circuit 520 remains de-energized.

Circuitry responsive to an SR instruction with the XC(03) bit set is also shown in FIG. 13B. The output channel control unit responds to such an instruction to determine which device card is presently connected or selected. This is accomplished by connecting the output of each latch to one of a plurality of AND circuits which are individually connected to wires in the QRB bus 100. For example, the latch 514 energizes an AND circuit 522; the latch 516, an AND circuit 524. These AND circuits constitute a gate which is enabled when an SR pulse and XC(03) signal energize an AND circuit 528 to set a flip-flop 526. The QRB wire which is connected to the AND circuit 522 is energized while the AND circuit 522 is enabled; no other QRB wire is energized. When the SRACK pulse from the enabling unit 114 (FIG. 4) is applied to the C input, the flip-flop 526 is reset and all the AND circuits, including the AND circuits 522 and 524, are disabled.

Now referring to FIG. 13A, after the OUTOP instruction has been decoded, the WCE signal from the distributor 92 (FIG. 9) and the XC(03) signal are applied to an OR circuit 530. When the OR circuit 530 is energized simultaneously with an OUTOP pulse, an AND circuit 532 sets a latch 534. The output of the OR circuit 530 is also coupled through an inverter 536 to an OR circuit 538 so de-energizing the OR circuit 530 or generating an A2PL pulse resets the latch 534. Whenever the latch 534 is reset, it provides one of these signals for an AND circuit 540 which, when energized, generates the OCHR signal.

The WCE signal also energizes an inverter 542 and an AND circuit 544. Each OUTOP pulse energizes AND circuits 544 and 546. The AND circuit 546 is additionally connected to the inverter 542 energized by the WCE signal. As the AND circuit 546 is coupled through an OR circuit 548 to a reset terminal of a latch 550 and as the AND circuit 544 energizes the set input, the latch 550 is set in response to an OUTOP instruction with the XC(05) bit set. Once the latch 550 is set, an AND circuit 552 energized by an inverter 553 sets a flip-flop 554 upon termination of the TDXCH pulse. The next TDXCH pulse, which is generated when the word count is loaded, energizes an AND circuit 556 which is enabled when the flip-flop 554 is set. The output from the AND circuit 556, the LOAD WC pulse analogous to the LOAD WC pulse from the input channel control unit 40, resets the latch 550 to disable the AND circuit 552.

When the second TDXCH pulse terminates, the flip-flop 554 is reset to disable the LOAD WC signal.

The AND circuit 556 also sets a latch 560 to apply one signal to an AND circuit 562; this signal indicates that a word count has been loaded. Thereafter signals from the output word counter 139 (FIG. 6) indicating that all data words have been transferred energize the AND CIRCUIT 562.

Assuming other internal conditions permit the OCHR signal to be generated, the A2PL pulse resets the latch 534 and the OCHR signal is transferred to the buffer unit 46. This signal also enables an AND circuit 564 so that the following TDOC pulse triggers a monostable multivibrator 566 with each transfer of data to the output channel register 70 (FIG. 3). An INC pulse from the multivibrator 566 is transferred to the output byte control unit 138 (FIG. 6) to increment the internal counter which is analogous to the counter described with reference to the input byte control unit 40 (FIG. 11). When the output channel register 70 (FIG. 3) is full, a TURN ARD signal is generated by the output byte control unit.

As previously indicated, the AND circuit 562 is energized when all words have been transferred. The output of this circuit energizes both AND circuits 568 and 570. As the output of the AND circuit 568 is coupled through an inverter 572, a latch 574 is set when the AND circuit 568 is deenergized. When all words have been transferred, the AND circuit 570 sets a latch 576 and generates the OEOF signal. The latch 576 is reset when either the DCACK or a following OUTOP pulse energize an OR circuit 578.

Assuming that the data block transfer is starting, the latch 574 is set and energizes an OR circuit 580. As will be described, the remaining inputs to the OR circuit 580 indicate an OUTOP instruction has occurred, so a flip-flop 582 is set. This flip-flop has special characteristics, and is set or reset by a signal applied to the S or R inputs respectively. In addition, a clock pulse to the C input transfers the signal on the D input to the Q output. In the specific embodiment, the TURN ARD signal applied to the D input through an inverter 583 and the output from the multivibrator 566 applied to the C input reset the flip-flop 582. Therefore, the flip-flop 582 is reset when the output channel register 70 is full and cannot accept more data. Therefore, the Q output goes to a logical zero. As a result the AND circuit 540 is disabled and the latch 574 is reset. If the output channel register 70 is not full, the TURN ARD signal does not exist; and the flip-flop 582 remains set. It is possible to transfer additional data from computer memory when the flip-flop 582 is set. As the OUTOP pulse is coupled through an inverter 585 and then applied to the AND circuit 540, an OCHR pulse cannot be generated while an OUTOP instruction is being decoded.

Certain other functions are performed in response to ODACK pulses from the output data register 72 (FIG. 7). Each ODACK pulse energizes a delayed multivibrator 587 to produce an output pulse. An OR circuit 584 responds to the pulse to set a latch 586; each pulse from the multivibrator 566 resets the latch 586. AND circuits 588 and 590 are energized by the Q and $\bar{Q}$ outputs of the latch 586 respectively and by an OUTOP pulse. When the output channel register 70 is fully loaded, the data is transferred and the ODACK pulse is generated so the latch 586 is set. If a complete word has been transferred, a next OUTOP pulse energizes the AND circuit 588. The output from the AND circuit 588 indicates that no data resides in the output channel register 70, so no data will be lost. On the other hand, if the output channel register 70 is partially loaded, the next OUTOP pulse energizes the AND circuit 590. When the AND circuit 590 is energized, a latch 592 is set and generates an ODA signal indicating that data has been lost. The latch 592 is reset by the DCACK signal. In addition the outputs of the AND circuits 588 and 590 are connected to the OR circuit 580 to set the flip-flop 582.

When the TURN ARD signal and the output pulse from the multivibrator 566 exist simultaneously, an AND circuit 594 sets a latch 596. The outputs from the multivibrator 566, flip-flop 596 and an inverter 597 energized by the multivibrator 587 set a flip-flop 598 through an AND circuit 599. Setting the flip-flop 598 enables one of the AND circuits, such as the AND circuits 518 and 520 (FIG. 13B), with a gate DCS signal to load the device card register and generates the ODACK signal.

In addition to setting the latch 586 and disabling the AND circuit 599 the ODACK signal and resultant pulse from the multivibrator 583 perform other functions. The leading edge of the multivibrator pulse resets the latch 596 through an OR circuit 602 which may additionally be energized by an OUTOP pulse or a computer RESET pulse. The trailing edge of the multivibrator pulse resets the flip-flop 598, and the pulse increments the output word counter (WC INC pulse).

Hence, the next TDOC pulse loads the next computer word into the transfer unit 44 (FIG. 3). When the transfer unit 44 has been completely filled with data as indicated by the TURN ARD signal from the byte control unit, an ODCS signal is generated and remains until the output data register is ready to accept the data. When this occurs, the data is transferred and the resulting ODACK signal disables the ODCS signal. The output control unit also immediately enables the transfer unit 44 to receive the next data word.

8. Executive Control Unit —Interrupting Signal Sensor, Encoder and Enabling Unit The circuitry necessary to provide the monitoring and interrupting functions is shown in FIG. 14. For purposes of monitoring, an SR pulse generated by an SR instruction sets a flip-flop 610 while an SNSDV pulse sets a flip-flop 612, both of which are located in the enabling unit 114. Either output energizes an OR circuit 614 generating a signal which is coupled to the interrupting signal encoder 112 as a one INEN signal (FIG. 4). In addition, the output of the OR circuit 614 is also coupled to an OR circuit 615 to generate a XCHIR signal and to an inverter 616 to disable other interrupting signals.

If any DSL signal energizes an OR circuit 618, the OR circuit 618 energizes an AND circuit 619 and directly sets a flip-flop 620 if the XCHS signal is not asserted and if a monostable multivibrator 621 is reset. As described later, the monostable multivibrator 621 is triggered on only by a DSLACK or DCACK signal. An OR circuit 622 directly resets the flip-flop 620 in response to either a computer issued reset signal or an SR instruction with the XC(00) bit set. An AND circuit 623 energizes both the J and K inputs only when a DSL interruption occurs. If DSL information is obtained in response to the SR instruction, the AND circuits 623 disables the J and K inputs so the flip-flop 620 cannot respond to a GDXCH pulse. The details of the operation of the flip-flop 620 are described later.

Each CRFS signal is compared with a MR signal from the mask register (FIG. 4). For example, the MR($n$) and CRFS($n$) signals are examined for coincidence in an AND circuit 634 while the MR(0) and CRFS(0) signals are examined in an AND circuit 636. If any AND circuit is energized, the signals are coupled through an OR circuit 638 and to another AND circuit 640. In addition to being responsive to the inverted XCHS pulse, the AND circuit 640 responds to the output from a latch 642. Latch 642 is set by the application of either a TIEP pulse or computer RESET signal through an OR circuit 644 to the S input to enable the AND circuit 640. The latch 642 is reset by a CRFSACK pulse. When the AND circuit 640 is energized, it sets a flip-flop 643. Therefore, the signals from the AND circuits 624, 630 and 640 constitute the INT signals to the enabling unit 114.

The signal from the inverter 616 and the set output from the flip-flop 620 are both applied to an AND circuit 650. If neither an SR nor an SNSDV pulse exists, the DSL interrupt energizes an OR circuit 652. If the other input of an AND circuit 654 is simultaneously energized, the SCHIR signal is generated by the OR circuit 615. However, if either the SR or SNSDV pulses occur, the inverted output of the OR circuit 614 disables the AND circuit 650; therefore, SR and SNSDV instructions take priority over DSL interrupting signals.

An AND circuit 656 is energized by the Q output of the flip-flop 632, the inverter 616 and the $\bar{Q}$ output of the flip-flop 620. Therefore a DC interrupting signal is not recognized if a DSL interrupting signal exists or the SR instruction or SNSDV instruction have been generated and not serviced. An AND circuit 658 assigns the lowest interrupting priority to CRFS interrupting signals. The outputs of the AND circuits 656 and 658 are also coupled to the OR circuit 652 to generate the XCHIR signal.

In the discussion of the various instructions it was noted that the XC(08) bit of an INRD, INOP, TIEP, or SR instruction would be set if it were desired to alter the interruption response characteristics. Whenever the XC(08) bit is set in one of the four instructions, a latch 660 is set to enable the AND circuit 654. At all other times the latch 660 is reset to thereby prevent interruptions. Specifically the INRD, INOP, TIEP, and SR pulses are coupled through an OR circuit 661. The OR circuit 661, in turn, energizes AND circuits 663 and 665 which are energized by the XC(08) bit and by the inverted XC(08) bit provided by an inverter 662 respectively. The outputs of the AND circuits 663 and 665 either set or reset the latch 660. Therefore, the AND circuit 654 is disabled if the XC(08) bit is at a logical zero in one of the four instructions and subsequent interruptions are inhibited.

Whenever an interrupting signal on one of the AND circuits 650, 656 and 658 is recognized, it is applied to the interrupting signal encoder 112 as an INEN signal. Another INEN signal is produced if an SR instruction is issued with the XC(00) bit set. An AND circuit 670 is energized by the SR pulse and the XC(00) signal and directly sets a flip-flop 672. Setting the flip-flop 672 enables an OR circuit 664 to issue the INEN signal and load the profile from the DSL bus onto the XC bus 54. The flip-flop 672 is subsequently reset by a clocking SRACK pulse.

Setting the flip-flop 672 causes the $\bar{Q}$ output to disable the AND circuit 623. Therefore, a clocking GDXCH pulse to the C input of the flip-flop 620 cannot affect the output so the flip-flop 620 is always left in a reset condition after an SR instruction. The Q output of the flip-flop 672 also energizes the OR circuit 622 to hold the flip-flop 620 in a reset condition during the execution of the SR instruction. Hence, once the SR instruction is issued, no changes can occur which would otherwise cause an interrupt, and the SR instruction retrieves the information on the DSL bus which exists at the time of the instruction.

When a DSL interrupting condition sets the flip-flop 620 and energizes the OR circuit 664, it also energizes the AND circuit 623. In this condition, the flip-flop 672 is reset so the J and K inputs are enabled and the subsequent GDXCH pulse resets the flip-flop 620 after the DSL information is obtained.

When information is being transferred to the computer in response to a DSL interruption or to an SR instruction with the XC(00) bit set, it is important that no data changes occur during the reading cycle. To accomplish this, the OR circuit 664 normally applies a reset signal to a latch 673 through an inverter 674. Hence, an AND circuit 675 is disabled and the output, the DSLEN signal is not asserted. When either a DSL interruption or SR instruction causes the OR circuit 664 to be energized, the inverter 674 is immediately deenergized so no signals are asserted at either the S or R inputs of the latch 673. When the DSLACK signal is generated in time coincidence with the GDXCH signal, an OR circuit 676 activates the multivibrator 621. The output pulse simultaneously sets the flip-flop 673 and generates the DSLEN signal from the AND circuit 675. Subsequently, the OR circuit 664 is deenergized so that assertive signals are applied to both inputs of the latch 673. Under these conditions, the latch 673 remains set, and the DSLEN signal continues to be asserted. Subsequently, the multivibrator 621 resets, disables the AND circuit 675 and terminates the DSLEN pulse to reset the latch 673. Hence, the DSLEN signal is generated and transferred to the device card while information is actually being read so that no changes in this information can occur.

GDXCH pulses are also coupled to the C inputs of flip-flop 610, 612, 632 and 643 to acknowledge receipt of the interrupting request. The GDXCH pulse resets that flip-flop for which the interruption has been recognized on its trailing edge. Interruption recognition is acknowledged by one of the AND circuits 677, 678, 679 and 680. AND circuit 677 is energized by the output of the OR circuit 664 and the GDXCH pulse to produce the DSLACK pulse which indicates that the DSL profile of the selected device card is being transferred to the computer. When a GDXCH pulse transfers the DC profile to the computer, the AND circuit 678 is previously energized by the output of the AND circuit 656 and generates the DCACK pulse. The DCACK pulse also energizes the OR circuit 676 to activate the multivibrator 621 and thereby cause the AND circuit 675 to generate the DSLEN signal. If a CRFS signal successfully interrupts the system, the CRFSACK pulses issues from the AND circuit 679. Finally, the AND circuit 680 generates the SRACK pulse in time coincidence with the GDXCH pulse of either the flip-flop 610 or 612 has been set.

Each signal on the QRB bus 100, DSL bus, DC bus and CRFS bus is coupled through the interrupting signal encoder 112 onto the XC bus 54. As specifically shown in FIG. 14, the QRB(n) wire is connected to an AND circuit 682 and the QRV(0) wire, to the AND circuit 684. When these two circuits are energized by the output of the OR circuit 614, the interruption profile is transferred onto the XC(*n*) and XC(00) buses through the OR circuits 686 and 688. Similarly, a DSL(*n*) signal and a DSL(0) signal are coupled through AND circuits 690 and 692 respectively upon the generation of an output from the OR circuit 664. The AND circuit 656 couples the DC(*n*) and DC(0) signals through AND circuits 694 and 696 while the output of AND circuit 658 encodes the signal applied to the AND circuits 698 and 700, the CRFS(*n*) and CRFS(0) signals respectively. In addition, the outputs of the OR CIRCUIT 664 and AND circuits 656 and 658 are applied to the two additional stages of the interrupting signal encoder 112 to indicate which circuit and class of interrupting signals have been recognized.

In this manner, the interrupting sensor 104, the interrupting encoder 112 and the enabling circuit 114 recognize an interrupting condition in priority with other conditions and instructions. The interruption condition is identified by a word placed on the XC bus which defines the class of interruption and the status of all signals in the class. This word is then transferred to the computer under the control of the enabling circuit 114.

The foregoing discussion specifically with reference to FIGS. 7 through 14 describe one embodiment of an interface adapted to incorporate various aspects of this invention. It should be evident that many variations of the specific embodiment are possible. For example, the INRD instruction has been discussed solely in terms of providing an address to a peripheral. However, not all peripherals require such address. The INRD instruction may, in such cases, perform other tasks such as controlling peripheral operation especially where the number of control bits exceeds the capability of the TCB instruction. To a certain extent, therefore, the utilization of the INRD instruction, like the TCB and SNSDV instructions is arbitrary, and depends upon the peripheral and device card construction. Furthermore, the interface may respond to interrupting conditions differently. For example, in the described embodiment, the interface responds to DSL signals from any device card. In other interfaces, response may be limited to a device card actually connected to the input and output control channels.

In addition to altering the utilization of instructions, their format may also be varied if appropriate circuit changes are made. Function codes and microcoding formats can all be altered. However, such changes do not alter one of the features of this invention whereby the interface responds to different instructions from the computer.

As is evident, changes in the format of an instruction necessitate circuit changes. It is also possible to alter the specific circuits from those defined in the various logic schematics. Different counter and comparison circuits can be substituted for the word counters in the input and output channel control units, for example.

Details related to timing, signal isolation and other matters which pertain to specific implementation of the invention have not been included. Such details vary with each embodiment. Furthermore, these details are known to those of ordinary skill in the art.

Finally, it is realized that many component changes might be made in implementing this invention. The various circuits have been defined in terms of logical OR and AND circuits and other specific components. In actual practice, logical NAND and NOR circuits might be used. Generally assertive signals of logic ones have been used in the description. Equivalent assertive signals of logical zeroes might also be used. Still other equivalent logic circuits might be substituted by persons of ordinary skill in the art.

However, it is intended that all such equivalent forms and variations of the system generally described with reference to FIGS. 1 through 6 and more specifically described with reference to FIGS. 7 through 14 should be covered by the appended claims.

Therefore, what is claimed as new and desired to be secured by Letters Patent of the United States is:

1. An interface for coupling a computer and a plurality of peripherals, the computer and peripherals each being adapted for transmitting and receiving data and control signals, the interface supervising data interchange between the computer and each peripheral and comprising:

A. control signal interchanging means adapted to be connected to the computer for interchanging data with the computer responsive to control signals from the computer and related interface control signals from and to the interface, B. a plurality of register means, each register means being adapted to have at least one peripheral connected thereto and being adapted for i. interchanging data and peripheral control signals with their respective peripherals ii. interchanging related control signals with the interface, and iii. interchanging data with the computer, C. control means connected to the control signal interchanging means and responsive to interface control signals from one of the register means or the control signal interchanging means to transmit control signals to the other of the means, and D. plural independent parallel data transfer means in parallel with the control signal interchanging means for coupling the computer and register means to transfer data therebetween, the control means independently controlling the register means and control signal interchanging means to thereby supervise data transfers between the computer and each peripheral.

2. An interface as recited in claim 1 wherein

A. the control signal interchanging means transmits interface control signals in response to computer-issued instructions received by it, and B. the control means additionally comprises a register means selection decoder responsive to certain instruction words for identifying a selected peripheral by coupling one data transfer means to the register means associated with the selected peripheral.

3. An interface as recited in claim 2 wherein one peripheral transmits data from internally identified locations, the interface being adapted to respond to a computer issued initialization instruction identifying the peripheral and the internally identified storage location and including:

A. a counter in the associated register means for storing the address, and

B. means responsive to the register means selection decoder for enabling the counter to store the identification.

4. An interface as recited in claim 2 additionally including means for sensing the conditions related to interface operations, the control means additionally comprising A. means responsive to a computer-issued monitoring instruction for identifying a specific sensing means for encoding a digital word indicating the state of the identified condition sensing means, and B. means for transferring the encoded word to the computer through the control signal interchanging means.

5. An interface as recited in claim 2 wherein one peripheral is adapted to receive data from the computer in response to a computer-issued output instruction, the register means selection decoder identifying the register means associated with one peripheral, the interface control means additionally comprising an output controller A. being responsive to the register means selection decoder and signal interchanging means for connecting a first data transfer means between the identified register means and the computer, and B. including means responsive to the control signal interchanging means and the register means for supervising the transfer of data from the computer to the selected peripheral through the register means.

6. An interface as recited in claim 5 wherein data is transferred from the computer as a plurality of data words, each data word containing a plurality of digital bits, the computer being programmed to issue, in succession, the output instruction word and an output word count identifying the number of data words to be transferred, the output controller additionally comprising A. an output counter for storing the output word count, B. means responsive to the application of the output instruction to the decoder and the control means to enable the output counter to store the output word count, C. means connected to the output counter for generating an output word count signal when the identified number of data words is transferred, and D. means responsive to the word count signal for disconnecting the first data transfer means for the register means.

7. An interface as recited in claim 6 wherein the computer has allotted successive memory locations for storing the data words and the computer is programmed to issue an initial output computer address in succession after the output word count, A. the first data transfer means including i. an output computer address counter for storing the initial output computer address, ii. means responsive to the register selection decoder and the control means for enabling the output computer address counter to receive the initial output computer address, iii. means responsive to each transfer of data from the computer for altering the count in the output computer address counter, and iv. means connected to the output computer address counter for generating an output address signal indicating that data has been transferred from all allotted computer memory locations, and B. the output controller including means responsive to the output address signal for disconnecting the first data transfer means from the register means.

8. An interface as recited in claim 7 wherein the data is to be transferred to a specific peripheral location and wherein the computer is programmed to issue an output peripheral identifying the location in succession after the output computer address, the register means additionally comprising A. an output peripheral address counter for storing the output peripheral address, B. means responsive to the register selection decoder and the control means for enabling the output peripheral address counter to receive the instruction, and C. means responsive to the transfer of data from the register means for altering the location stored in the output peripheral address counter.

9. An interface as recited in claim 2 wherein one peripheral is adapted to transmit data to the computer in response to a computer-issued input instruction, the register selection decoder identifying the register means associated with the one peripheral, the interface control means additionally comprising an input controller A. being responsive to the register selection decoder and the control means for connecting second data transfer means between the identified register means and the computer, and B. including means responsive to the control signal interchange means and the register means for supervising the transfer of data to the computer from the selected peripheral through the register means.

10. An interface as recited in claim 9 wherein data is transferred to the computer as a plurality of data words, each data word containing a plurality of digital bits, the computer being programmed to issue, in succession, the input instruction and an input word count identifying the number of data words to be transferred, the input controller additionally comprising A. an input counter for storing the input word count, B. means responsive to the application of the input instruction to the operations decoder means and the control means to enable the input word counter to store the input word count, C. means connected to the input counter for generating an input word count signal when the identified number of data words is transferred, and D. means responsive to the input word count signal for disconnecting the second data transfer means from the register means.

11. An interface as recited in claim 10 wherein the computer has allotted successive memory locations for storing the data words and the computer is programmed to issue an initial input computer address in succession after the input word count, A. the second data transfer means including i. an input computer address counter for storing the initial input computer address, ii. means responsive to the register selection decoder and the control means for enabling the input computer address counter to receive the initial input computer address, iii. means responsive to each transfer of data to the computer for altering the count in the input computer address counter, and iv. means connected to the input computer address counter for generating an input address signal indicating that data has been transferred from all allotted computer memory locations, and B. the input controller including means responsive to the input address signal for disconnecting the second data transfer means from the register means.

12. An interface as recited in claim 2 wherein one of the register means includes means responsive to a predetermined control portion of a computer issued control instruction identifying the register means and including:

A. means in the register means responsive to the control portion, and

B. means responsive to the register means selection decoder and control signal interchanging means for enabling the control instruction responsive means to respond to the predetermined portion of the control instruction.

13. An interface as recited in claim 2 wherein one register means includes means responsive to a control word issued by the computer, the computer issuing an immediately preceding control initialization instruction identifying the register means and indicating that the control word immediately follows and including:

A. means in the associated register means responsive to the control word, and

B. means responsive to the register means selection decoder and control signal interchanging means for enabling the control word responsive means to receive the control word when the control word is issued by the computer.

14. An interface as recited in claim 2 including a sensor for generating an interrupting signal in response to a predetermined condition, the control means additionally comprising:

A. a first signal generator for interrupting computer operation,

B. a second signal generator for producing a signal identifying the predetermined condition to the computer, and C. means responsive to the first and second signal generators for transferring the second generated signal to the computer.

15. An interface as recited in claim 14 including a plurality of sensors for generating interrupting signals in response to a plurality of predetermined conditions, each condition being in a distinct condition class, A. the second signal generator including an encoder for encoding an instruction word for the computer identifying the class and the status of all conditions in the class, B. the control means includes means for transferring the encoded instruction word to the computer.

16. An interface as recited in claim 15 wherein sensors in one condition class are connected to each register means, each register means including means for storing the signals from a sensor and for generating information in response to conditions in peripherals connected to that register means, the storage means in each register means being connected in priority so signals from the storage means associated with a higher priority register means disable like signals from register means with a lower priority, each register means additionally including means for identifying the source of the signals.

17. An interface as recited in claim 15 wherein the certain of the sensors generate data interrupting signals when associated register means are prepared to transfer data to the computer, the interface being responsive to a computer issued masking instruction to control the response of the first and second signal generators to data interrupting signals and including:

A. signal masking means responsive to portions of the masking instruction and the data interrupting signals for enabling data interrupting signals defined by the masking instruction to energize the first and second signal generators, and B. means responsive to the control signal interchanging means for enabling the masking means to respond to the portions of the masking instruction.

18. An interface as recited in claim 2 additionally comprising

A. an output control in a first data transfer means for controlling data transfers from the computer B. an input control in the second data transfer means for controlling data transfers to the computer, and C. means in the control means for readying the input and output controls in response to signals from the control signal interchanging means.

19. An interface as recited in claim 18 wherein the control signal interchanging means includes A. a first gate for transferring instructions from the computer to the control means, B. a second gate for transferring instructions from the control means to the computer, C. an interface decoder for generating interface control signals with each data and instruction transfer, and D. an interface encoder for generating computer control signals in response to interface control signals.

20. An interface as recited in claim 19 wherein the computer control signals include programmed operating instructions, the control means including A. an instruction register for storing computer issued operating instructions coupled through the first gate, B. an operations decoder for generating operation signals in response to predetermined portions of the operating instruction, C. a register selection decoder for generating signals in response to other portions of the operating instructions, and D. a timer responsive to the operations decoder and the interface decoder for enabling the instruction register to receive operating instructions.

21. An interface as recited in claim 20 including a plurality of sensors responsive to predetermined conditions in the interface and each peripheral and means responsive to certain condition sensors for generating interrupting signals, the conditions being categorized in a plurality of priority classes and the control means comprising A. an interrupting signal sensor connected to each condition sensor in a priority class for providing a signal identifying the priority class, B. priority gating means responsive to the interrupting signal sensors for recognizing the interrupting signal having the highest priority, and C. an interruption encoder responsive to the interrupting signal from the priority gating means and the signals from all condition sensors in the recognized class for generating an instruction identifying the category and the status of all interrupting signals in the category.

22. An interface as recited in claim 21 wherein one set of sensors and interrupting signal generator means in a first priority class monitor peripheral conditions for all peripherals connected to one register means, each register means being arranged in priority and including means for disabling the interrupting signal generator means in lower priority register means whereby peripheral condition information can be transferred to the computer from any register means in the interface.

23. An interface as recited in claim 21 wherein the interruption encoder is coupled to the input and output controls and the control means, the operations decoder being adapted to couple one condition sensing means to the interruption encoder.

24. An interface as recited in claim 23 wherein the peripheral includes internal control means responsive to predetermined digital bits in certain computer instructions and wherein the register means connected to the peripheral includes means connected to the operations decoder, the register selection decoder and the first gate for transferring the predetermined digital bits to the peripheral internal control means.

25. An interface as recited in claim 23 wherein at least one peripheral is adapted to transfer data to the computer and the register means connected thereto includes A. an input data register for transferring data from the peripheral to the computer
B. means for generating an input data ready signal for the input control and one interrupting signal sensor when the input data register is loaded and
C. at least one condition sensor responsive to internal peripheral conditions, the internal peripheral condition sensor being connected to the interrupting signal sensor.

26. An interface as recited in claim 25 wherein the control means includes

A. a mask generator responsive to certain instructions from the computer and the operations decoder for generating masking signals,
B. means in the one interrupting signal sensor responsive to coincidence of data ready signals and masking signals for controlling the response of the one interrupting signal sensor.

27. An interface as recited in claim 25 adapted to transfer data directly to a specific computer memory location wherein the input control includes A. an input computer address generator for identifying the computer memory location,
B. an input register means selector responsive to the register selection decoder for enabling one register means
C. an input controller connected to the control signal interchanging means and the control means for initiating a data transfer from the input data register to the computer when the input data register is ready to transmit data.

28. An interface as recited in claim 27 wherein data is to be transferred from the peripheral as a plurality of digital words for storage in a plurality of allotted successive computer memory locations, the computer being adapted to issue, in succession, an input instruction, an input word count instruction identifying the number of data words to be transferred and an input computer memory address instruction identifying the initial computer memory location, the input controller including A. an input word counter for storing the input word count instruction,
B. means responsive to the application of the input instruction to the operations decoder to enable the input word counter to store the input word count instruction,
C. means connected to the register means and the input word counter for altering the count therein with each transfer of data from the input data register, the input controller including a condition sensor for generating an interrupting signal when all data words have been transferred,
D. an input computer address counter for storing the input computer address instruction,
E. means responsive to the application of the input instruction word to the operations decoder to enable the input computer address counter to store the input computer address instruction, and
F. means connected to the interface decoder and the input computer address counter for altering the count therein with each transfer of data to the computer memory, the input controller including another condition sensor for generating an interrupting signal when all allotted computer memory locations have been utilized.

29. An interface as recited in claim 28 wherein at least one peripheral transmits data from successive, internally identified locations, the computer being adapted to issue, in succession, an initialization instruction and an input peripheral address instruction identifying the initial location, the register means including A. an input peripheral address counter for storing the input peripheral address instruction, and
B. means connected to the operations decoder and the register selection decoder for enabling the input peripheral address counter to store the input peripheral address instruction, the counter being altered with the transfer of data from each internal location in the peripheral.

30. An interface as recited in claim 27 wherein certain conditions indicate a loss of data being transferred to the computer, the input controller including at least one condition sensor for sensing the data loss conditions and a second interrupting signal sensor for responding to the data loss signal for signalling the priority gating means and interruption encoder to interrupt computer operation.

31. An interface as recited in claim 28 wherein data is transferred to the computer as computer data words of a given number of discrete digital bits in parallel, wherein data is transferred from the input data register as an interface data word of another number of discrete digital bits in parallel, at least one computer data word being stored in the input data register and wherein the input instruction identifies the number of computer data words in an interface data word, the input data transfer means additionally including A. a second register for receiving all data bits from the input data register in a single transfer as in interface data word,
B. a transfer decoder responsive to the portion of the instruction identifying the number of computer data words in each interface data word, and
C. routing means connected to the transfer decoder and the second register for transferring the given number of parallel bits to the computer from successive portions of the second register.

32. An interface as recited in claim 28 adapted to be responsive to monitoring instructions from the computer, the interface additionally comprising A. a bus connected to the interruption encoder for transmitting monitoring information thereto for transfer to the computer,
B. means for transferring the count in the input word counter onto the bus in response to one monitoring instruction,
C. means for transferring the signals in the input register means selector onto the bus in response to another monitoring instruction,
D. means for transferring the count in the input computer address counter onto the bus in response to another monitoring instruction.

33. An interface as recited in claim 23 wherein at least one peripheral is adapted to transfer data from the computer and the register means connected thereto includes A. an output data register for transferring data from the computer to the peripheral,
B. means for generating an output data ready signal for the output control when the output data register has been loaded into the peripheral,
C. at least one condition sensor responsive to internal peripheral conditions, the internal peripheral condition sensor being connected to the interrupting signal sensor.

34. An interface as recited in claim 33 adapted to transfer data directly from a specific computer memory location wherein the output control includes A. an output computer address generator for identifying the computer memory location,
B. an output register means selector responsive to the register selection decoder for enabling one register means,
C. an output controller connected to the control signal interchanging means and the control means for initiating a data transfer to the output data register means from the computer when the output data register is ready to accept data.

35. An interface as recited in claim 34 wherein data is to be transferred to the peripheral as a plurality of digital words from storage in a plurality of allotted successive computer memory locations, the computer being adapted to issue, in succession, an output instruction, an output word count instruction identifying the number of data words to be transferred and an output computer memory address instruction identifying the initial computer memory location, the output controller including i. an output word counter for storing the output word count instruction, ii. means responsive to the application of the output instruction to the operations decoder to enable the output word counter to store the output word count instruction, iii. means connected to the register means and the output word counter for altering the count therein with each transfer of data to the output data register, the output controller including a condition sensor for generating an interrupting signal when all data words have been transferred, iv. an output computer address counter for storing the output computer address instruction, v. means responsive to the application of the output instruction word to the operations decoder to enable the output computer address counter to store the output computer address instruction, and vi. means connected to the interface decoder and output computer address counter for altering the count therein with each transfer of data from the computer memory, the output controller including another condition sensor for generating an interrupting signal when all allotted computer memory locations have been utilized.

36. An interface as recited in claim 35 wherein at least one peripheral accepts data in successive, internally identified locations, the computer being adapted to issue an output peripheral address instruction in succession after the output computer address instruction, the register means including A. an output peripheral address counter for storing the output peripheral address instruction, and B. means connected to the operations decoder and the register selection decoder for enabling the output peripheral address counter to store the output peripheral address instruction, the counter being altered with the transfer of data to each internal location in the peripheral.

37. An interface as recited in claim 35 wherein certain conditions indicate loss of data being transferred from the computer, the output controller including at least one condition sensor for sensing the data loss conditions and a second interrupting signal sensor for responding to the data loss signal for signalling the priority gating means and interruption encoder to interrupt computer operation.

38. An interface as recited in claim 35 wherein data is transferred from the computer as computer data words of a given number of discrete digital bits in parallel, wherein data is transferred to the output data register as an interface data word of another number of discrete digital bits in parallel, at least one computer data word being stored in the output data register and wherein the output instruction identifies the number of computer data words in an interface data word, the output data transfer means additionally including A. a second register for transferring all data bits to the output data register in a single transfer as an interface data word, B. a transfer decoder responsive to the portion of the instruction identifying the number of computer data words in each interface data word, and C. routing means connected to the transfer decoder and the second register for transferring the given number of parallel bits from the computer to successive portions of the second register.

39. An interface as recited in claim 35 adapted to be responsive to monitoring instructions from the computer, the interface additionally comprising A. a bus connected to the interruption encoder for transmitting monitoring information thereto for transfer to the computer, B. means for transferring the count in the output word counter onto the bus in response to one monitoring instruction, C. means for transferring the signals in the output register means selector onto the bus in response to another monitoring instruction, D. means for transferring the count in the output computer address counter onto the bus in response to another monitoring instruction.

* * * * *